United States Patent
Sasaki

(10) Patent No.: US 12,261,686 B2
(45) Date of Patent: Mar. 25, 2025

(54) CONTROL APPARATUS, OAM MODE-MULTIPLEXING TRANSMITTING APPARATUS, OAM MODE-MULTIPLEXING RECEIVING APPARATUS, CONTROL METHOD, AND NON-TRANSITORY COMPUTER READABLE MEDIUM

(71) Applicant: NEC Corporation, Tokyo (JP)

(72) Inventor: Eisaku Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 217 days.

(21) Appl. No.: 18/116,722

(22) Filed: Mar. 2, 2023

(65) Prior Publication Data
US 2023/0318732 A1 Oct. 5, 2023

(30) Foreign Application Priority Data

Mar. 3, 2022 (WO) .................. PCT/JP2022/009194
Sep. 13, 2022 (JP) ................................. 2022-145416

(51) Int. Cl.
H04J 14/04 (2006.01)
H04B 7/185 (2006.01)

(52) U.S. Cl.
CPC .............. *H04J 14/04* (2013.01); *H04B 7/185* (2013.01)

(58) Field of Classification Search
CPC ................................ H04J 14/04; H04B 7/185
USPC ......................................................... 398/44
See application file for complete search history.

(56) References Cited

U.S. PATENT DOCUMENTS

2012/0207470 A1* 8/2012 Djordjevic .......... H04J 14/0201
398/44
2018/0167703 A1* 6/2018 Willner .................... H04J 14/07

FOREIGN PATENT DOCUMENTS

CN            110212961 A  *  9/2019
CN            113381794 A  *  9/2021  ........... H04B 7/0617
WO     WO-2019189704 A1  * 10/2019  ............. H01Q 21/20

OTHER PUBLICATIONS

Tian Hui et al., "Beam axis detection and alignment for uniform circular array-based orbital angular momentum wireless communication" Aug. 29, 2015 (Year: 2015).*
Chen Rui et al., Beam Steering for the Misalignment in UCA-Based OAM Communication Systems Aug. 2018 (Year: 2018).*
Nobuhiko Sakuraya et al., "Compensation for axis misalignment of UCA with OAM beam control", IEICE Technical Report, RCS 2020-260, Mar. 2021, Japan.
Tian, Hui et al., "Beam axis detection and alignment for uniform circular array-based orbital angular momentum wireless communication", IET Communications vol. 10, Iss. 1, pp. 44-49, IET, Feb. 1, 2016.

(Continued)

*Primary Examiner* — Abbas H Alagheband
(74) *Attorney, Agent, or Firm* — Sughrue Mion, PLLC

(57) ABSTRACT

An OAM mode-multiplexing transmitting apparatus includes an OAM transmitting processing unit, a phase adjustment unit, a transmitting radio unit, a UCA (Uniform Circular Array) antenna, and a control unit (control apparatus). The UCA antenna includes a plurality of transmitting antenna elements. In the control apparatus, an acquisition unit acquires "information corresponding to a transmitting-side axis misalignment". A beam control unit controls a beam of the UCA antenna by controlling phases of N OAM (Continued)

mode-multiplexing signals based on the acquired "information corresponding to the transmitting-side axis misalignment".

16 Claims, 12 Drawing Sheets

(56) References Cited

OTHER PUBLICATIONS

Hirofumi Suganuma et al., "A Study on Inter-mode Interference Suppression Employing Even-numbered Modes for UCA-based OAM Multiplexing", IEICE Technical Report, Nov. 2019, vol. 119, No. 296, RCS2019-213(Nov. 2019), pp. 61-66, Japan.

Chen, Rui et al., "Misalignment-Robust Receiving Scheme for UCA-Based OAM Communication Systems", 2017 IEEE Vehicular Technology conference (VTC Spring), Jun. 7, 2017.

Wu, Xiong et al., "Inter-mode crosstalk compensation for radio orbital angular momentum multiplexing systems under misaligned condition using multiple-input multiple-output techniques", Optical Communications and Networks (ICOCN), 2016 15th International Conference, IEEE, Sep. 27, 2016.

Chen, Rui et al., "Beam Steering for the Misalignment in UCA-Based OAM Communication Systems", IEEE Wireless Communications Letters, vol. 7, No. 4, Aug. 2018, pp. 582-585.

* cited by examiner

CONTROL APPARATUS, OAM MODE-MULTIPLEXING TRANSMITTING APPARATUS, OAM MODE-MULTIPLEXING RECEIVING APPARATUS, CONTROL METHOD, AND NON-TRANSITORY COMPUTER READABLE MEDIUM

INCORPORATION BY REFERENCE

This application is based upon and claims the benefit of priority from International Patent Application NO. PCT/JP2022/009194, filed on Mar. 3, 2022, and Japanese patent application No. 2022-145416, filed on Sep. 13, 2022, the disclosure of which is incorporated herein in its entirety by reference.

TECHNICAL FIELD

The present disclosure relates to a control apparatus, an OAM mode-multiplexing transmitting apparatus, an OAM mode-multiplexing receiving apparatus, a control method, and a non-transitory computer readable medium.

BACKGROUND ART

In recent years, radio transmission methods using electromagnetic waves having an orbital angular momentum (OAM: Orbital Angular Momentum) have attracted attention (e.g., Nobuhiko Sakuratani, Toshihiko Nishimura, Takeo Ohgane (Hokkaido University), Tomoya Tandai, Daisuke Uchida (Toshiba Corporation), "Compensation for axis misalignment of UCA with OAM beam control" IEICE Technical Report, R C S 2020-260, March 2021 (hereinafter also referred to as Non-patent Literature 1)). In Non-patent Literature 1, it is mentioned that the characteristics of OAM mode-multiplexing transmission deteriorate due to an angular misalignment (an axis misalignment) between the array plane of the transmitting-side UCA (Uniform Circular Array) used for the OAM mode-multiplexing transmission and the array plane of the receiving-side UCA used therefor. Further, Non-patent Literature 1 mentions control of transmission beams as an example of the method for compensating for the above-described deterioration in characteristics.

However, in Non-patent Literature 1, regarding the deterioration in characteristics of OAM mode-multiplexing transmission caused by an axis misalignment, no method for detecting the type and the magnitude of the axis misalignment, which are required to compensate for the deterioration in characteristics through the control of beams, is discussed.

SUMMARY

An object of the present disclosure is to provide a control apparatus, an OAM mode-multiplexing transmitting apparatus, an OAM mode-multiplexing receiving apparatus, a control method, and a non-transitory computer readable medium capable of providing an automatic control method for compensating for a deterioration in characteristics of OAM mode-multiplexing transmission caused by an axis misalignment through control of transmission beams.

A control apparatus according to a first aspect is a control apparatus configured to control an OAM (Orbital Angular Momentum) mode-multiplexing transmitting apparatus configured to communicate with an OAM mode-multiplexing receiving apparatus, in which
the OAM mode-multiplexing transmitting apparatus includes:
a transmitting-side UCA (Uniform Circular Array) including a plurality of transmitting antenna elements arranged in a rotational-symmetrical manner and at equal distances from a center of the rotational symmetry, where the number N of transmitting antenna elements is equal to or greater than four;
fixed-weight OAM transmission processing means for forming a plurality of OAM (Orbital Angular Momentum) mode-multiplexing signals each of which is transmitted from a respective one of the plurality of transmitting antenna elements, where the number of OAM mode-multiplexing signals is equal to or less than N; and
phase adjustment means for adjusting phases of the plurality of OAM mode-multiplexing signals, the phase adjustment means being disposed between the plurality of transmitting antenna elements and the OAM transmission processing means, and
the control apparatus includes:
acquisition means for acquiring information corresponding to a transmitting-side axis misalignment, the transmitting-side axis misalignment being a deviation of an array plane of the transmitting-side UCA from a reference plane of the transmitting-side UCA; and
beam control means for outputting a signal for controlling the phase adjustment means based on the information corresponding to the acquired transmitting-side axis misalignment.

A control apparatus according to a second aspect is a control apparatus configured to control an OAM (Orbital Angular Momentum) mode-multiplexing receiving apparatus, in which
the OAM mode-multiplexing receiving apparatus includes:
a receiving-side UCA (Uniform Circular Array) including a plurality of receiving antenna elements arranged in a rotational-symmetrical manner and at equal distances from a center of the rotational symmetry; and
an adaptively-controlled OAM (Orbital Angular Momentum) receiving processing means for extracting a reception signal corresponding to one OAM mode by multiplying a plurality of reception signals by an OAM reception weight vector, each of the plurality of reception signals corresponding to a respective one of the plurality of receiving antenna elements, and
the OAM reception weight vector being a weight vector obtained as a result of adaptive control corresponding to the one OAM mode, and
the control apparatus includes:
information forming means for forming information corresponding to a transmitting-side axis misalignment based on an OAM reception weight amplitude component included in the OAM reception weight vector, the transmitting-side axis misalignment being a deviation of an array plane of the transmitting-side UCA of an OAM mode-multiplexing transmitting apparatus from a reference plane of the transmitting-side UCA; and
transmission control means for transmitting information corresponding to the transmitting-side axis misalignment to the OAM mode-multiplexing transmitting apparatus.

A control method according to a third aspect is a control method performed by a control apparatus configured to control an OAM (Orbital Angular Momentum) mode-multiplexing transmitting apparatus configured to communicate with an OAM mode-multiplexing receiving apparatus, in which the OAM mode-multiplexing transmitting apparatus includes:

a transmitting-side UCA (Uniform Circular Array) including a plurality of transmitting antenna elements arranged in a rotational-symmetrical manner and at equal distances from a center of the rotational symmetry, where the number N of transmitting antenna elements is equal to or greater than four;

fixed-weight OAM transmission processing means for forming a plurality of OAM (Orbital Angular Momentum) mode-multiplexing signals each of which is transmitted from a respective one of the plurality of transmitting antenna elements, where the number of OAM mode-multiplexing signals is equal to or less than N; and phase adjustment means for adjusting phases of the plurality of OAM mode-multiplexing signals, the phase adjustment means being disposed between the plurality of transmitting antenna elements and the OAM transmission processing means, and the control method includes:

acquiring information corresponding to a transmitting-side axis misalignment, the transmitting-side axis misalignment being a deviation of an array plane of the transmitting-side UCA from a reference plane of the transmitting-side UCA; and outputting a signal for controlling the phase adjustment means based on the information corresponding to the acquired transmitting-side axis misalignment.

A control method according to a fourth aspect is a control method performed by a control apparatus configured to control an OAM (Orbital Angular Momentum) mode-multiplexing receiving apparatus, in which the OAM mode-multiplexing receiving apparatus includes:

a receiving-side UCA (Uniform Circular Array) including a plurality of receiving antenna elements arranged in a rotational-symmetrical manner and at equal distances from a center of the rotational symmetry; and an adaptively-controlled OAM (Orbital Angular Momentum) receiving processing means for extracting a reception signal corresponding to one OAM mode by multiplying a plurality of reception signals by an OAM reception weight vector, each of the plurality of reception signals corresponding to a respective one of the plurality of receiving antenna elements, and the OAM reception weight vector being a weight vector obtained as a result of adaptive control corresponding to the one OAM mode, and the control method includes:

forming information corresponding to a transmitting-side axis misalignment based on an OAM reception weight amplitude component included in the OAM reception weight vector, the transmitting-side axis misalignment being a deviation of an array plane of the transmitting-side UCA of an OAM mode-multiplexing transmitting apparatus from a reference plane of the transmitting-side UCA; and transmitting information corresponding to the transmitting-side axis misalignment to the OAM mode-multiplexing transmitting apparatus.

A non-transitory computer readable medium according to a fifth aspect is a non-transitory computer readable medium storing a program for causing a control apparatus configured to control an OAM (Orbital Angular Momentum) mode-multiplexing transmitting apparatus configured to communicate with an OAM mode-multiplexing receiving apparatus to perform processing, in which the OAM mode-multiplexing transmitting apparatus includes:

a transmitting-side UCA (Uniform Circular Array) including a plurality of transmitting antenna elements arranged in a rotational-symmetrical manner and at equal distances from a center of the rotational symmetry, where the number N of transmitting antenna elements is equal to or greater than four;

fixed-weight OAM transmission processing means for forming a plurality of OAM (Orbital Angular Momentum) mode-multiplexing signals each of which is transmitted from a respective one of the plurality of transmitting antenna elements, where the number of OAM mode-multiplexing signals is equal to or less than N; and phase adjustment means for adjusting phases of the plurality of OAM mode-multiplexing signals, the phase adjustment means being disposed between the plurality of transmitting antenna elements and the OAM transmission processing means, and the process includes:

acquiring information corresponding to a transmitting-side axis misalignment, the transmitting-side axis misalignment being a deviation of an array plane of the transmitting-side UCA from a reference plane of the transmitting-side UCA; and outputting a signal for controlling the phase adjustment means based on the information corresponding to the acquired transmitting-side axis misalignment.

A non-transitory computer readable medium according to a sixth aspect is a non-transitory computer readable medium storing a program for causing a control apparatus configured to control an OAM (Orbital Angular Momentum) mode-multiplexing receiving apparatus to perform processing, in which the OAM mode-multiplexing receiving apparatus includes:

a receiving-side UCA (Uniform Circular Array) including a plurality of receiving antenna elements arranged in a rotational-symmetrical manner and at equal distances from a center of the rotational symmetry; and an adaptively-controlled OAM (Orbital Angular Momentum) receiving processing means for extracting a reception signal corresponding to one OAM mode by multiplying a plurality of reception signals by an OAM reception weight vector, each of the plurality of reception signals corresponding to a respective one of the plurality of receiving antenna elements, and the OAM reception weight vector being a weight vector obtained as a result of adaptive control corresponding to the one OAM mode, and the process includes:

forming information corresponding to a transmitting-side axis misalignment based on an OAM reception weight amplitude component included in the OAM reception weight vector, the transmitting-side axis misalignment being a deviation of an array plane of the transmitting-side UCA of an OAM mode-multiplexing transmitting apparatus from a reference plane of the transmitting-side UCA; and transmitting information corresponding to the transmitting-side axis misalignment to the OAM mode-multiplexing transmitting apparatus.

A transmission system according to a seventh aspect is a transmission system including an OAM (Orbital Angular Momentum) mode-multiplexing transmitting apparatus and an OAM mode-multiplexing receiving apparatus, in which the OAM mode-multiplexing transmitting apparatus includes:

a transmitting-side UCA (Uniform Circular Array) including a plurality of transmitting antenna elements arranged in a rotational-symmetrical manner and at equal distances from a center of the rotational symmetry, where the number N of transmitting antenna elements is equal to or greater than four;

fixed-weight OAM transmission processing means for forming a plurality of OAM (Orbital Angular Momentum) mode-multiplexing signals each of which is transmitted from a respective one of the plurality of transmitting antenna elements, where the number of OAM mode-multiplexing signals is equal to or less than N;

phase adjustment means for adjusting phases of the plurality of OAM mode-multiplexing signals, the phase adjustment means being disposed between the plurality of transmitting antenna elements and the OAM transmission processing means;

acquisition means for acquiring information corresponding to a transmitting-side axis misalignment, the transmitting-side axis misalignment being a deviation of an array plane of the transmitting-side UCA from a reference plane of the transmitting-side UCA; and beam control means for outputting a signal for controlling the phase adjustment means based on the information corresponding to the acquired transmitting-side axis misalignment, and the OAM mode-multiplexing receiving apparatus includes:

a receiving-side UCA including a plurality of receiving antenna elements arranged in a rotational-symmetrical manner and at equal distances from a center of the rotational symmetry;

an adaptively-controlled OAM (Orbital Angular Momentum) receiving processing means for extracting a reception signal corresponding to one OAM mode by multiplying a plurality of reception signals by an OAM reception weight vector, each of the plurality of reception signals corresponding to a respective one of the plurality of receiving antenna elements, and the OAM reception weight vector being a weight vector obtained as a result of adaptive control corresponding to the one OAM mode;

information forming means for forming information corresponding to the transmitting-side axis misalignment based on an OAM reception weight amplitude component included in the OAM reception weight vector; and transmission control means for transmitting information corresponding to the transmitting-side axis misalignment to the OAM mode-multiplexing transmitting apparatus.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENT

Figure 1:
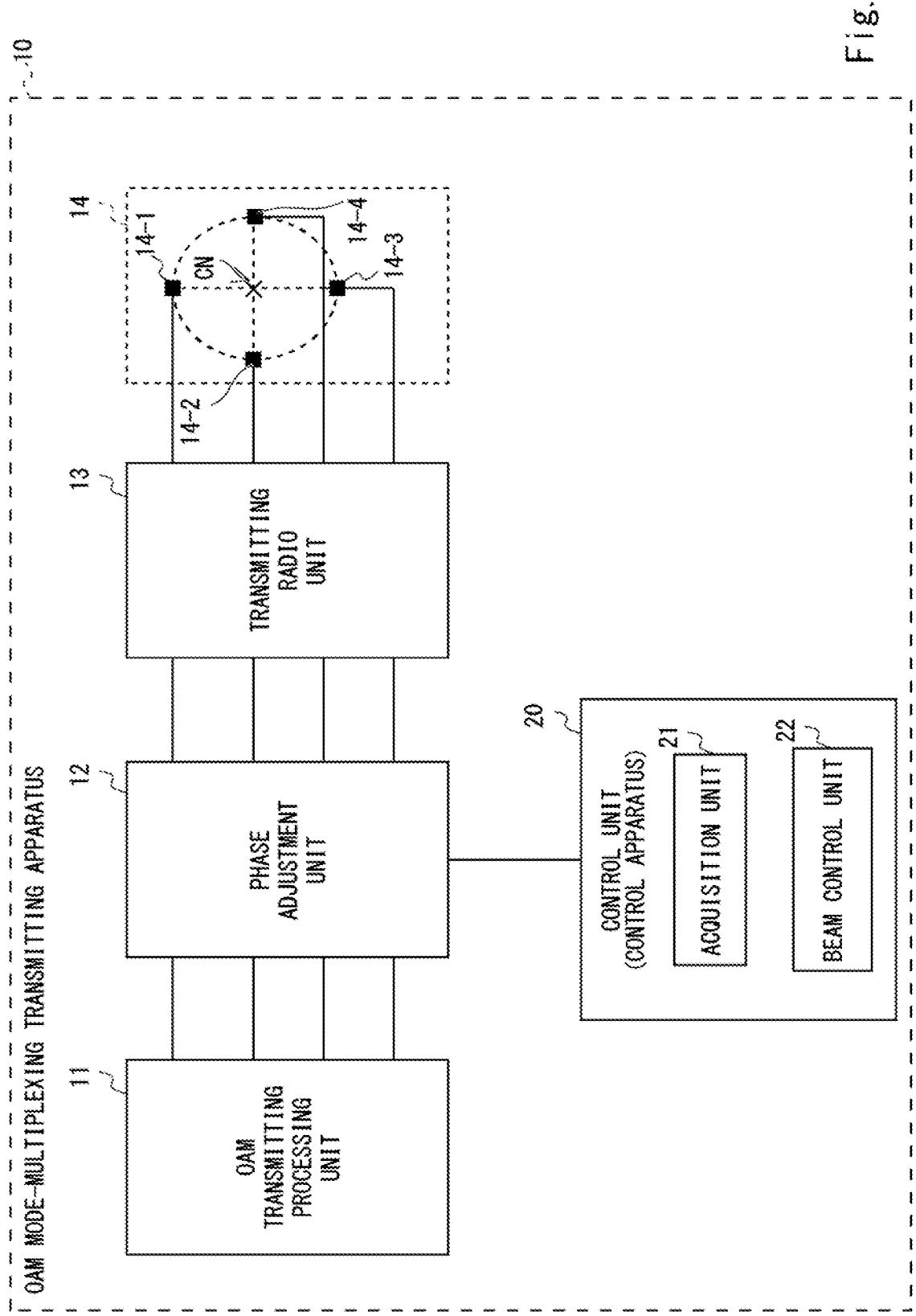
FIG. 1 is a block diagram showing an example of an OAM mode-multiplexing transmitting apparatus according to a first example embodiment.

An example embodiment will be described hereinafter with reference to the drawings. Note that the following descriptions and drawings are partially omitted and simplified as appropriate for clarifying the explanation. Further, the same reference numerals (or symbols) are assigned to the same components throughout the drawings, and duplicate descriptions thereof are omitted as appropriate. Further, specific numeral values and the like shown below are merely examples for facilitating the understanding of the present disclosure, and actual numeral values and the like are not limited to these examples.

First Example Embodiment

Configuration Example of OAM Mode-multiplexing Transmitting Apparatus

FIG. 1 is a block diagram showing an example of an OAM mode-multiplexing transmitting apparatus according to a first example embodiment. In FIG. 1, the OAM mode-multiplexing transmitting apparatus 10 includes an OAM transmitting processing unit 11, a phase adjustment unit 12, a transmitting radio unit 13, a UCA (Uniform Circular Array) antenna 14, and a control unit (control apparatus) 20. In the following description, the "OAM mode-multiplexing transmitting apparatus" may also be referred to as the "OAM transmitting apparatus". Note that the following description will be given based on the assumption that the control unit (control apparatus) 20 is included in the OAM mode-multiplexing transmitting apparatus 10, but the present disclosure is not limited to this example. For example, the control unit (control apparatus) 20 is an apparatus separate from the OAM mode-multiplexing transmitting apparatus 10, and may be used by connecting it to the OAM mode-multiplexing transmitting apparatus 10 through a cable or wirelessly.

The UCA (Uniform Circular Array) antenna 14 includes a plurality of antenna elements 14-1 to 14-N. The UCA antenna 14 is an array antenna in which N antenna elements 14-1 to 14-N are arranged on a circle centered at a center CN. Further, each of the antenna elements 14 forms one array plane. N is an integer equal to or greater than four. In actual studies, N is typically a power of 2, and in particular 8 or 16, but for the sake of simplicity, a case where N is four (N=4) will be described hereinafter as an example.

The OAM transmitting processing unit 11 forms a plurality of OAM mode-multiplexing signals each of which is transmitted from a respective one of the antenna elements 14-1 to 14-4.

For example, the OAM transmitting processing unit 11 receives M data symbols $SI_{11}$ to $SI_{1M}$ that are independent of each other (M is an integer no smaller than 2 and no larger than N). M is the number of multiplexed modes. In this example, since N is four (N=4), it is assumed that M is, for example, four (M=4). Further, the OAM transmitting processing unit 11 forms four OAM mode-multiplexing signals $SO_{11}$ to $SO_{14}$, each of which corresponds to a respective one of the antenna elements 14-1 to 14-4, by multiplying the received data symbols $SI_{11}$ to $SI_{14}$ by an "OAM transmission weight matrix", which is a fixed DFT (Discrete Fourier Transform) matrix or an IDFT (Inverse Discrete Fourier Transform) matrix. Then, the OAM transmitting processing unit 11 outputs the four formed OAM mode-multiplexing signals $SO_{11}$ to $SO_{14}$ to the antenna elements 14-1 to 14-4. These four OAM mode-multiplexing signals $SO_{11}$ to $SO_{14}$ will be transmitted from the antenna elements 14-1 to 14-4, respectively.

Note that the four row vectors in the "OAM transmission weight matrix" correspond to the above-described four antenna elements 14-1 to 14-4, respectively. Further, the four column vectors in the "OAM transmission weight matrix" correspond to the four different "OAM modes", respectively. That is, the four column vectors in the "OAM transmission weight matrix" are different from each other in regard to the amount of deviation (the amount of phase change) between the values of the four vector elements in the column vector. With this "OAM transmission weight matrix", the four data symbols $SI_{11}$ to $SI_{14}$ are transmitted in the four different "OAM modes", respectively. Specifically, an OAM mode-multiplexing signal to be transmitted from one antenna element 14 is formed by the product of one row vector in the "OAM transmission weight matrix" and the column vector including the data symbols $SI_{11}$ to $SI_{14}$ as its elements.

The phase adjustment unit 12 is disposed between the transmitting radio unit 13 and the OAM transmitting processing unit 11. The phase adjustment unit 12 adjusts the phases of the OAM mode-multiplexing signals $SO_{11}$ to $SO_{14}$ output from the OAM transmitting processing unit 11.

The transmitting radio unit 13 performs a transmitting radio process (i.e., a digital-to-analog conversion, an up-conversion, and the like) on each of the phase-adjusted multiplex signal $SO_{11}$ to $SO_{14}$, and thereby obtains four radio signals. These four radio signals are transmitted from the antenna elements 14-1 to 14-4, respectively.

The control unit (control apparatus) 20 includes an acquisition unit 21 and a beam control unit 22.

The acquisition unit 21 acquires "information corresponding to a transmitting-side axis misalignment". Note that the "transmitting-side axis misalignment" is a deviation of the array plane of the transmitting-side UCA 14 from the "reference plane" of the transmitting-side UCA 14. The "reference surface (hereinafter also referred to as the "reference plane in the ideal state")" of the transmitting-side UCA 14 is the array plane of the transmitting-side UCA 14 under the ideal condition in which the receiving-side UCA of the OAM mode-multiplexing receiving apparatus (not shown) and the transmitting-side UCA 14 are directly (i.e., exactly) opposed to each other. Further, the "reference surface (hereinafter also referred to as the "reference plane in the ideal state")" of the receiving-side UCA (not shown) is the array plane of the receiving-side UCA (not shown) under the ideal condition in which the receiving-side UCA (not shown) and the transmitting-side UCA 14 are directly (i.e., exactly) opposed to each other. When the receiving-side UCA (not shown) and the transmitting-side UCA 14 satisfy the ideal condition, i.e., they are directly opposed to each other, the channel matrix between the receiving-side UCA (not shown) and the transmitting-side UCA 14 becomes a circulant matrix. In this state, in the case where the transmission/reception signal processes are DFT/IDFT, an OAM signal in which a plurality of modes are multiplexed is demultiplexed without causing interference therebetween. The "information corresponding to the transmitting-side axis misalignment" is information that is obtained by processing (i.e., converting) information that is observed when the transmitting-side axis misalignment has occurred into a value that serves as a function of the transmitting-side axis misalignment. Examples of the "information that is observed when a transmitting-side axis misalignment has occurred" includes a change in the reception level in each element of the receiving-side UCA and a change in the output of an accelerometer that indicates the deviation of the transmitting-side UCA. Under normal circumstances, the beam emitting direction is perpendicular to the array plane. In the following description, this beam emitting direction with respect to the reference plane may also be referred to as the "reference beam direction".

The beam control unit 22 electronically corrects the "beam emitting direction" by controlling the phase adjustment unit 12 and thereby correcting the signal phases of the antenna elements 14-1 to 14-4 based on the "information corresponding to the transmitting-side axis misalignment". The "beam emitting direction" that has not been electronically corrected is determined by the array plane, which is mechanically determined by the transmitting UCA antenna 14.

For example, the beam control unit 22 performs control so as to direct the beam in such a direction that the "transmitting-side axis misalignment" is cancelled out. Here, the direction perpendicular to the "reference plane in the ideal state" of the transmitting-side UCA 14 is referred to as an "ideal beam emitting direction". Then, it is possible to make the beam emitting direction of the transmitting-side UCA 14 closer to (or coincide with) the "ideal beam emitting direction" by the control performed by the beam control unit 22.

As described above, according to the first example embodiment, in the control apparatus 20, the acquisition unit 21 acquires "information corresponding to a transmitting-side axis misalignment". The beam control unit 22 controls the beam of the transmitting-side UCA antenna 14 by controlling the phases of four OAM mode-multiplexing signals based on the acquired "information corresponding to the transmitting-side axis misalignment".

By the above-described configuration of the control apparatus 20, it is possible to acquire "information corresponding to a transmitting-side axis misalignment", and to control the beam by controlling the phases of four OAM mode-multiplexing signals based on the acquired "information corresponding to the transmitting-side axis misalignment". In this way, it is possible to carry out control for compensating for a deterioration in characteristics of OAM mode-multiplexing transmission caused by an axis misalignment.

Note that the control method is performed by the control apparatus 20. This control method includes controlling beams of a plurality of OAM mode-multiplexing signals by acquiring information corresponding to a transmitting-side axis misalignment, which is a deviation of the array plane of the transmitting-side UCA 14 from the reference plane of the transmitting-side UCA 14, and controlling the adjustment of the phases of the plurality of OAM mode-multiplexing signals based on the acquired information corresponding to the transmitting-side axis misalignment.

Second Example Embodiment

A second example embodiment relates to an example embodiment in which "information corresponding to a transmitting-side axis misalignment" is transmitted from an OAM mode-multiplexing receiving apparatus.

Configuration Example for OAM Mode-multiplexing Transmitting Apparatus

Figure 2:
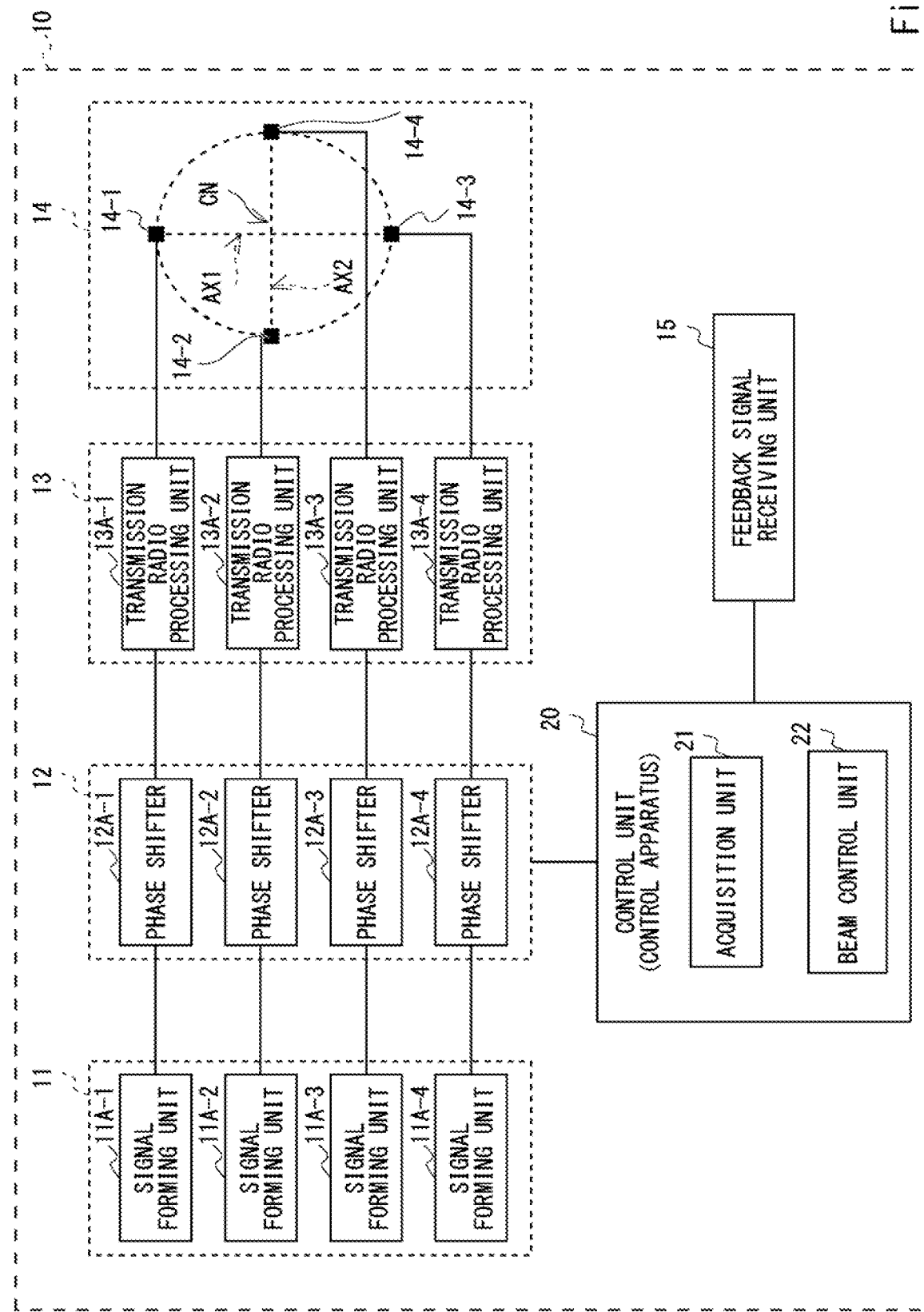
FIG. 2 is a block diagram showing an example of an OAM mode-multiplexing transmitting apparatus according to a second example embodiment.

FIG. 2 is a block diagram showing an example of an OAM mode-multiplexing transmitting apparatus according to the second example embodiment. In FIG. 2, the OAM mode-multiplexing transmitting apparatus 10 according to the second example embodiment includes an OAM transmitting processing unit 11, a phase adjustment unit 12, a transmitting radio unit 13, a UCA (Uniform Circular Array) antenna 14, a feedback signal receiving unit 15, and a control unit (control apparatus) 20. Note that the following description will be given on the assumption that the control unit (control apparatus) 20 is included in the OAM mode-multiplexing transmitting apparatus 10, but the present disclosure is not limited to this example. For example, the control unit (control apparatus) 20 is an apparatus separate from the OAM mode-multiplexing transmitting apparatus 10, and may be used by connecting it to the OAM mode-multiplexing transmitting apparatus 10 through a cable or wirelessly.

The feedback signal receiving unit 15 receives a feedback signal transmitted from an OAM mode-multiplexing receiving apparatus 30 (which will be described later). This feedback signal includes "information corresponding to a transmitting-side axis misalignment". Further, the acquisition unit 21 according to the second example embodiment acquires the "information corresponding to the transmitting-side axis misalignment" from the feedback signal.

The "information corresponding to a transmitting-side axis misalignment" is formed, for example, based on OAM reception weights used for OAM reception processing performed in the OAM mode-multiplexing receiving apparatus 30 (which will be described later). For example, the "information corresponding to a transmitting-side axis misalignment" may include a "polarity of a difference between two OAM reception weights". Note that a "polarity of a difference between two OAM reception weights" included in an OAM reception weight vector used for the OAM reception processing has a property that indicates that a "transmitting-side axis misalignment" has occurred and a direction in which the "transmitting-side axis misalignment" has occurred.

The OAM transmitting processing unit 11 includes signal forming units 11A-1, TTA-2, TTA-3 and TTA-4.

The signal forming unit 11A-1 receives four data symbols $SI_{11}$ to $SI_{14}$. Then, the signal forming unit 11A-1 multiplies the data symbols $SI_{11}$ to $SI_{14}$ by a row vector (a transmission weight vector) in an OAM transmission weight matrix corresponding to the antenna element 14-1. In this way, the signal forming unit 11A-1 forms an OAM mode-multiplexing signal $SO_{11}$ which will be transmitted from the antenna element 14-1.

The signal forming unit 11A-2 receives the four data symbols $SI_{11}$ to $SI_{14}$. Then, the signal forming unit 11A-2 multiplies the data symbols $SI_{11}$ to $SI_{14}$ by a row vector (a transmission weight vector) in an OAM transmission weight matrix corresponding to the antenna element 14-2. In this way, the signal forming unit 11A-2 forms an OAM mode-multiplexing signal $SO_{12}$ which will be transmitted from the antenna element 14-2.

The signal forming unit 11A-3 receives the four data symbols $SI_{11}$ to $SI_{14}$. Then, the signal forming unit 11A-3 multiplies the data symbols $SI_{11}$ to $SI_{14}$ by a row vector (a transmission weight vector) in an OAM transmission weight matrix corresponding to the antenna element 14-3. In this way, the signal forming unit 11A-3 forms an OAM mode-multiplexing signal $SO_{13}$ which will be transmitted from the antenna element 14-3.

The signal forming unit 11A-4 receives the four data symbols $SI_{11}$ to $SI_{14}$. Then, the signal forming unit 11A-4 multiplies the data symbols $SI_{11}$ to $SI_{14}$ by a row vector (a transmission weight vector) in an OAM transmission weight matrix corresponding to the antenna element 14-4. In this way, the signal forming unit TTA-4 forms an OAM mode-multiplexing signal $SO_{14}$ which will be transmitted from the antenna element 14-4.

The phase adjustment unit 12 adjusts the phases of the OAM mode-multiplexing signals $SO_{11}$ to $SO_{14}$ output from the OAM transmitting processing unit 11 based on a "phase adjustment signal".

For example, the phase adjustment unit 12 includes phase shifters 12A-1, 12A-2, 12A-3 and 12A-4.

The phase shifter 12A-1 shifts the phase of the OAM mode-multiplexing signals $SO_{11}$ by an amount corresponding to a "first phase shift value" contained in the "phase adjustment signal" received from the beam control unit 22.

The phase shifter 12A-2 shifts the phase of the OAM mode-multiplexing signals $SO_{12}$ by an amount corresponding to a "second phase shift value" contained in the "phase adjustment signal" received from the beam control unit 22.

The phase shifter 12A-3 shifts the phase of the OAM mode-multiplexing signals $SO_{13}$ by an amount corresponding to a "third phase shift value" contained in the "phase adjustment signal" received from the beam control unit 22.

The phase shifter 12A-4 shifts the phase of the OAM mode-multiplexing signals $SO_{14}$ by an amount corresponding to a "fourth phase shift value" contained in the "phase adjustment signal" received from the beam control unit 22.

The transmitting radio unit 13 includes transmitting radio processing units 13A-1, 13A-2, 13A-3 and 13A-4.

The transmitting radio processing unit 13A-1 performs a transmitting radio process (i.e., a digital-to-analog conversion, an up-conversion, and the like) on the phase-shifted OAM mode-multiplexing signal $SO_{11}$, and thereby obtains a radio signal. This radio signal is transmitted from the antenna element 14-1.

The transmitting radio processing unit 13A-2 performs a transmitting radio process (i.e., a digital-to-analog conversion, an up-conversion, and the like) on the phase-shifted OAM mode-multiplexing signal $SO_{12}$, and thereby obtains a radio signal. This radio signal is transmitted from the antenna element 14-2.

The transmitting radio processing unit 13A-3 performs a transmitting radio process (i.e., a digital-to-analog conversion, an up-conversion, and the like) on the phase-shifted OAM mode-multiplexing signal $SO_{13}$, and thereby obtains a radio signal. This radio signal is transmitted from the antenna element 14-3.

The transmitting radio processing unit 13A-4 performs a transmitting radio process (i.e., a digital-to-analog conversion, an up-conversion, and the like) on the phase-shifted OAM mode-multiplexing signal $SO_{14}$, and thereby obtains a radio signal. This radio signal is transmitted from the antenna element 14-4.

In the control unit (control apparatus) 20, the acquisition unit 21 acquires "information corresponding to a transmitting-side axis misalignment". The "information corresponding to the transmitting-side axis misalignment" includes "first polarity information" and "second polarity information". The "first polarity information" indicates the polarity of a difference between two OAM reception weights corresponding to a second receiving-side antenna pair (receiving antenna elements 31-2 and 31-4) of a receiving-side UCA 31 (which will be described later). The second receiving-side antenna pair (receiving antenna elements 31-2 and 31-4) corresponds to a "second transmitting-side antenna pair". The "second transmitting-side antenna pair" includes two transmitting antenna elements 14-2 and 14-4. The two transmitting antenna elements 14-2 and 14-4 are disposed so to be opposed to each other with the array center CN therebetween. Further, the "second polarity information" indicates the polarity of a difference between the two other OAM reception weights corresponding to a first receiving-side antenna pair (receiving antenna elements 31-1 and 31-3) of the receiving-side UCA 31. The first receiving-side antenna pair (receiving antenna elements 31-1 and 31-3) corresponds to a "first transmitting-side antenna pair". The "first transmitting-side antenna pair" includes the two other transmitting antenna elements 14-1 and 14-3. The two other transmitting antenna elements 14-1 and 14-3 are disposed so to be opposed to each other with the array center CN therebetween.

That is, the two transmitting antenna elements 14-1 and 14-3 of the first transmitting-side antenna pair are disposed so to be opposed to each other with the center of the rotational symmetry therebetween, arranged in the vertical direction, and disposed on a "first axis (axis AX1)". The transmitting antenna elements 14-2 and 14-4 of the second transmitting-side antenna pair are disposed so to be opposed to each other with the center of the rotational symmetry therebetween, arranged in the horizontal direction, and disposed on a "second axis (axis AX2)" which intersects the aforementioned first axis. Further, the two receiving antenna elements 31-1 and 31-3 of the first receiving-side antenna pair correspond to the first transmitting-side antenna pair and are disposed on a "third axis (axis AX3)". The two other receiving antenna elements 31-2 and 31-4 of the second receiving-side antenna pair correspond to the second transmitting-side antenna pair and are disposed on a "fourth axis (axis AX4)" which intersects the third axis.

The beam control unit 22 forms a "phase adjustment signal" based on the "first polarity information" and the "second polarity information". This "phase adjustment signal" includes the above-described "first phase shift value", the "second phase shift value", the "third phase shift value", and the "fourth phase shift value".

Figure 3:
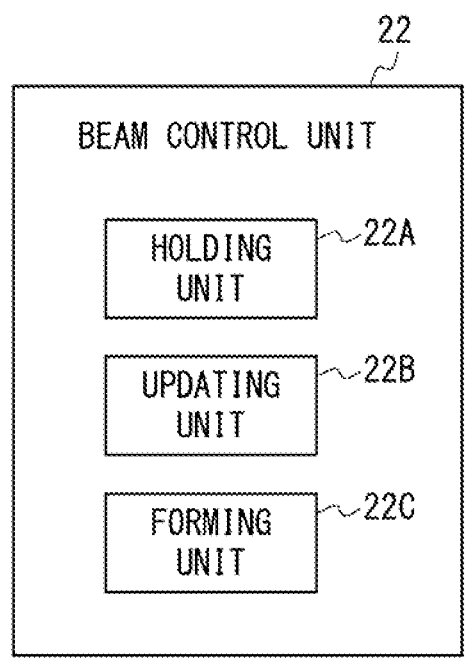
FIG. 3 is a block diagram showing an example of a beam control unit.

For example, the beam control unit 22 includes a holding unit 22A, an update unit 22B and a forming unit 22C. FIG. 3 is a block diagram showing an example of the beam control unit.

The holding unit 22A holds the current "first angle adjustment value" and the current "second angle adjustment value". The "first angle adjustment value" is a value of an angle around the axis AX1 (the aforementioned first axis) extending in a direction connecting the positions of the transmitting antenna elements 14-1 and 14-3 included in the first transmitting-side antenna pair. Further, the "second angle adjustment value" is a value of an angle around the axis AX2 (the aforementioned second axis) in a direction connecting the positions of the transmitting antenna elements 14-2 and 14-4 included in the second transmitting-side antenna pair. For example, the axis AX1 (first axis) is a vertical axis and the axis AX2 (second axis) is a horizontal axis. That is, the axis AX1 (first axis) and the axis AX2 (second axis) are orthogonal to each other. In this case, the "first angle adjustment value" indicates an azimuth (AZ) angle, and the "second angle adjustment value" indicates an elevation (EL) angle.

The update unit 22B updates the "first angle adjustment value" held in the holding unit 22A based on the "first polarity information". Then, the update unit 22B outputs the updated "first angle adjustment value" to the forming unit 22C, and makes the holding unit 22A hold the updated "first angle adjustment value" as the current "first angle adjustment value". Further, the update unit 22B updates the "second angle adjustment value" held in the holding unit 22A based on the "second polarity information". Then, the update unit 22B outputs the updated "second angle adjustment value" to the forming unit 22C, and makes the holding unit 22A hold the updated "second angle adjustment value" as the current "second angle adjustment value".

For example, the update unit 22B updates the "first angle adjustment value" at regular time intervals based on the below-shown Expression (1).
[Expression 1]

$$\theta_{i+1} = \theta_i - \Delta \times C_{AZ} \tag{1}$$

In the Expression (1), $\theta_i$ is a "first angle adjustment value" before an update, and $\theta_{i+1}$ is a "first angle adjustment value" after the update. A is a fixed adjustment step width. $C_{AZ}$ is "first polarity information (e.g., +1 or −1)".

Note that when the first polarity information has a negative value, $(-\Delta \times C)$ has a positive value. That is, when the first polarity information indicates a transmitting-side axis misalignment in the negative direction, the current "first angle adjustment value" is updated by adding $(-\Delta \times C)$ having a positive value to the current "first angle adjustment value" in order to cancel out the transmitting-side axis misalignment.

Further, the update unit 22B updates the "second angle adjustment value" based on the below-shown Expression (2). [Expression 2]

$$\psi_{i+1} = \psi_i - \Delta \times C_{EL} \tag{2}$$

In the Expression (2), $\psi_i$ is a "second angle adjustment value" before an update, and $\psi_{i+1}$ is a "second angle adjustment value" after the update. $\Delta$ is a fixed adjustment step width. $C_{EL}$ is "second polarity information (e.g., +1 or −1)".

The forming unit 22C forms a "phase adjustment signal" for adjusting the direction of the beam based on the updated first and second angle adjustment values, and the initial values of the first and second angle adjustment values.

For example, the forming unit 22C holds a correspondence relationship between candidate values of the first and second angle adjustment values and the "first phase shift value", the "second phase shift value", the "third phase shift value", and the "fourth phase shift value". Then, the forming unit 22C may form a phase adjustment signal containing a "first phase shift value", a "second phase shift value", a "third phase shift value" and a "fourth phase shift value" corresponding to the updated first and second angle adjustment values in the correspondence relationship. This correspondence relationship may be, for example, a table or a relational expression.

Note that the updated first and second angle adjustment values can be defined as parameters defining a "direction adjustment reference plane used for beam adjustment". Further, the initial values of the first and second angle adjustment values can be defined as parameters defining an "initial direction adjustment reference plane". For example, the initial values of the first and second angle adjustment values are both zero. The forming unit 22C forms a phase adjustment signal for shifting the beam emitting direction of the transmitting-side UCA 14 from the "reference beam direction" by an amount equivalent to an angle from the "initial direction adjustment reference plane" to the "direction adjustment reference plane used for beam adjustment". As described above, the "reference beam direction" is a direction perpendicular to the array plane, i.e., one plane formed by the antenna elements 14-1 to 14-N.

Note that, in the second example embodiment, the control unit (control apparatus) 20 does not have any information about the "deviated plane" to which the array plane of the transmitting-side UCA antenna 14 has been deviated from the "reference plane in the ideal state". However, by adjusting the beam emitting direction of the transmitting-side UCA 14 by using the "direction adjustment reference plane used for beam adjustment", the beam emitting direction of the transmitting-side UCA 14 can be directed (i.e., adjusted) to a direction perpendicular to the "combined plane" of the "deviated plane" and the "direction adjustment reference plane used for beam adjustment". This "combined plane" is closer to the "reference plane in the ideal state" as compared to the "deviated plane". Therefore, by directing (i.e., adjusting) the beam emitting direction of the transmitting-side UCA 14 to the direction perpendicular to the "combined plane", the beam emitting direction of the transmitting-side UCA 14 can be brought closer to (or made to coincide with) the "ideal beam emitting direction". As described above, the direction perpendicular to the "reference plane in the ideal state" of the transmitting-side UCA 14 is defined as the "ideal beam emitting direction". That is, as the above-described control is stabilized, the combined plane coincides with the reference plane in the ideal state. That is, the beam emitting direction of the transmitting-side UCA 14 coincides with the "ideal beam emitting direction".

Configuration Example of OAM Mode-multiplexing Receiving Apparatus

Figure 4:
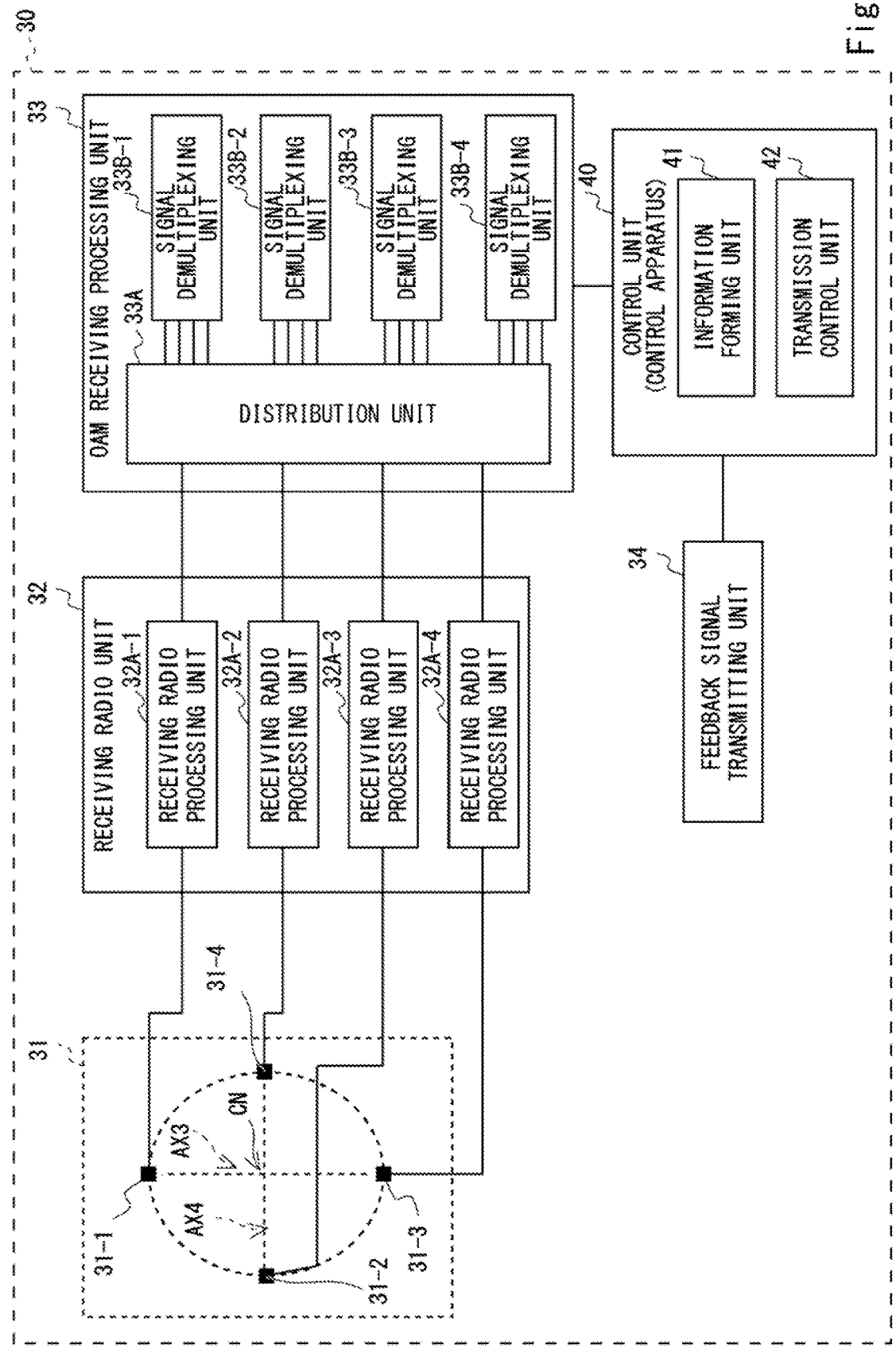
FIG. 4 is a block diagram showing an example of an OAM mode-multiplexing receiving apparatus according to the second example embodiment.

FIG. 4 is a block diagram showing an example of an OAM mode-multiplexing receiving apparatus according to the second example embodiment. In FIG. 4, the OAM mode-multiplexing receiving apparatus 30 according to the second example embodiment include a UCA (Uniform Circular Array) antenna 31, a receiving radio unit 32, an OAM receiving processing unit 33, a feedback signal transmitting unit 34, and a control unit (control apparatus) 40. Note that the following description will be given on the assumption that the control unit (control apparatus) 40 is included in the OAM mode-multiplexing receiving apparatus 30, but the present disclosure is not limited to this example. For example, the control unit (control apparatus) 40 is an apparatus separate from the OAM mode-multiplexing receiving apparatus 30, and may be used by connecting it to the OAM mode-multiplexing receiving apparatus 30 through a cable or wirelessly.

The UCA (Uniform Circular Array) antenna 31 includes a plurality of antenna element 31-1 to 31-N. The UCA antenna 31 is an array antenna in which N antenna elements 31-1 to 31-N are arranged on a circle centered at an array center CN. N is an integer equal to or greater than four. In the following description, for the sake of simplicity, a case where N is four (N=4) will be described as an example.

The receiving radio unit 32 obtains four reception signals by performing a receiving radio process (i.e., a down-conversion, an analog-to-digital conversion, and the like) on four reception radio signals received at the receiving antenna elements 31-1 to 31-4, respectively. These four reception signals are input to the OAM receiving processing unit 33. These four reception signals are signals in which four OAM mode-multiplexing signals transmitted from the OAM mode-multiplexing transmitting apparatus 10 are spatially multiplexed.

For example, the receiving radio unit 32 includes receiving radio processing units 32A-1, 32A-2, 32A-3 and 32A-4.

The receiving radio processing unit 32A-1 obtains a reception signal by performing a receiving radio process (i.e., a down-conversion, an analog-to-digital conversion, and the like) on a reception radio signal received at the receiving antenna element 31-1.

The receiving radio processing unit 32A-2 obtains a reception signal by performing a receiving radio process (i.e., a down-conversion, an analog-to-digital conversion, and the like) on a reception radio signal received at the receiving antenna element 31-2.

The receiving radio processing unit 32A-3 obtains a reception signal by performing a receiving radio process (i.e., a down-conversion, an analog-to-digital conversion, and the like) on a reception radio signal received at the receiving antenna element 31-3.

The receiving radio processing unit 32A-4 obtains a reception signal by performing a receiving radio process (i.e., a down-conversion, an analog-to-digital conversion, and the like) on a reception radio signal received at the receiving antenna element 31-4.

The OAM receiving processing unit 33 performs an OAM receiving process (a signal demultiplexing process) by multiplying four reception signals $SI_{21}$ to $SI_{24}$ by an "OAM reception weight matrix". Data symbols $SO_{21}$ to $SO_{24}$ are obtained by this signal demultiplexing process. Ideally, these data symbols $SO_{21}$ to $SO_{24}$ match (i.e., are identical to) the data symbols $SI_{11}$ to $SI_{14}$ on the transmitting side. Further, the OAM receiving processing unit 33 adaptively corrects the "OAM reception weight matrix" so as to minimize an error vector (i.e., a receiving error) between the data symbols $SO_{21}$ to $SO_{24}$ and the symbols on the constellation in order to improve the accuracy of the demultiplexing of the signal. Note that the initial value of the OAM reception weight matrix is, for example, the conjugate transposed matrix of the "OAM transmission weight matrix".

For example, the OAM receiving processing unit 33 includes a distribution unit 33A and signal demultiplexing units 33B-1, 33B-2, 33B-3 and 33B-4.

The distribution unit 33A distributes the four reception signals $SI_{21}$ to $SI_{24}$ obtained in the receiving radio processing units 32A-1 to 32A-4 to each of the signal demultiplexing units 33B-1 to 33B-4. The signal demultiplexing unit 33B-1 corresponds to a first OAM mode and the signal demultiplexing unit 33B-2 corresponds to a second OAM mode. The signal demultiplexing unit 33B-3 corresponds to a third OAM mode and the signal demultiplexing unit 33B-4 corresponds to a fourth OAM mode. The first, second, third and fourth OAM modes are different from one another.

The signal demultiplexing unit 33B-1 obtains the data symbol $SO_{21}$ by multiplying a reception signal vector composed of the four reception signals $SI_{21}$ to $SI_{24}$ by an OAM reception weight vector corresponding to the first OAM mode.

The signal demultiplexing unit 33B-2 obtains the data symbol $SO_{22}$ by multiplying the reception signal vector composed of the four reception signals $SI_{21}$ to $SI_{24}$ by an OAM reception weight vector corresponding to the second OAM mode.

The signal demultiplexing unit 33B-3 obtains the data symbol $SO_{23}$ by multiplying the reception signal vector composed of the four reception signals $SI_{21}$ to $SI_{24}$ by an OAM reception weight vector corresponding to the third OAM mode. The signal demultiplexing unit 33B-4 obtains the data symbol $SO_{24}$ by multiplying the reception signal vector composed of the four reception signals $SI_{21}$ to $SI_{24}$ by an OAM reception weight vector corresponding to the fourth OAM mode.

As shown in FIG. 4, the control unit (control apparatus) 40 includes an information forming unit 41 and a transmission control unit 42.

The information forming unit 41 forms, for example, "information corresponding to a transmitting-side axis misalignment" based on two OAM reception weights included in the OAM reception weight vector corresponding to the first OAM mode. The "first OAM mode" may be an OAM mode 0 (the lowest order mode of the OAM, and one that is the same as the Gaussian beam).

Further, the "first OAM mode" may be selected according to the distance between the OAM mode-multiplexing transmitting apparatus 10 and the OAM mode-multiplexing receiving apparatus 30. When the polarity of the "information corresponding to the transmitting-side axis misalignment" is reversed due to the condition for the choice of the "first OAM mode" and the distance, the polarity of the detected signal is used as information for the control after reversing the polarity thereof. Whether the polarity should be reversed or not can be known in advance from the provided condition.

For example, the information forming unit 41 calculates a difference between the amplitude components of two OAM reception weights corresponding to the "second receiving-side antenna pair", and thereby species the polarity (positive or negative) of the difference. The "second receiving-side antenna pair" includes two receiving antenna elements 31-2 and 31-4 that are disposed so to be opposed to each other with the array center CN therebetween in the receiving antenna elements 31-1 to 31-4. The specified polarity corresponds to the above-described "first polarity information".

Further, the information forming unit 41 calculates a difference between the amplitude components of the two other OAM reception weights corresponding to the "first receiving-side antenna pair", and thereby species the polarity (positive or negative) of the difference The "first receiving-side antenna pair" includes the two other receiving antenna elements 31-1 and 31-3 that are disposed so to be opposed to each other with the array center CN therebetween in the receiving antenna elements 31-1 to 31-4. This specified polarity corresponds to the above-described "second polarity information". The direction in which the receiving antenna elements 31-1 and 31-3 are arranged (the axis AX3 (the vertical axis, the above-described third axis)) is perpendicular to the direction in which the receiving antenna elements 31-2 and 31-4 are arranged (the axis AX4 (the horizontal axis, the above-described fourth axis)).

Then, the information forming unit 41 forms "information corresponding to the transmitting-side axis misalignment" including "first polarity information" and "second polarity information".

Figure 5:
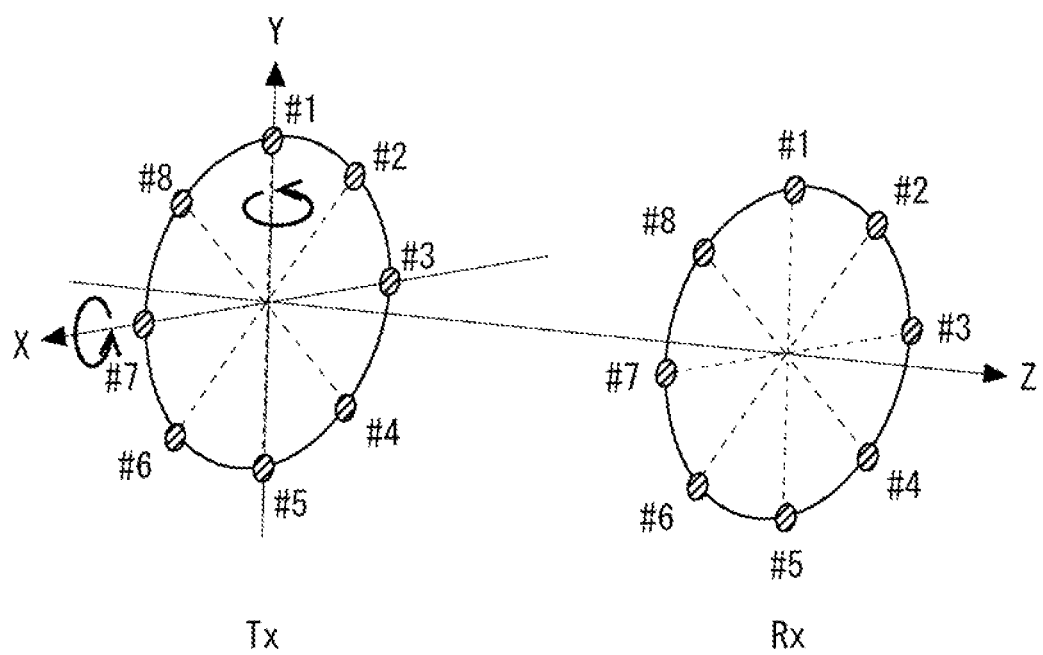
FIG. 5 shows an example of a transmitting-side UCA antenna Tx and a receiving-side UCA antenna Rx.
Figure 6:
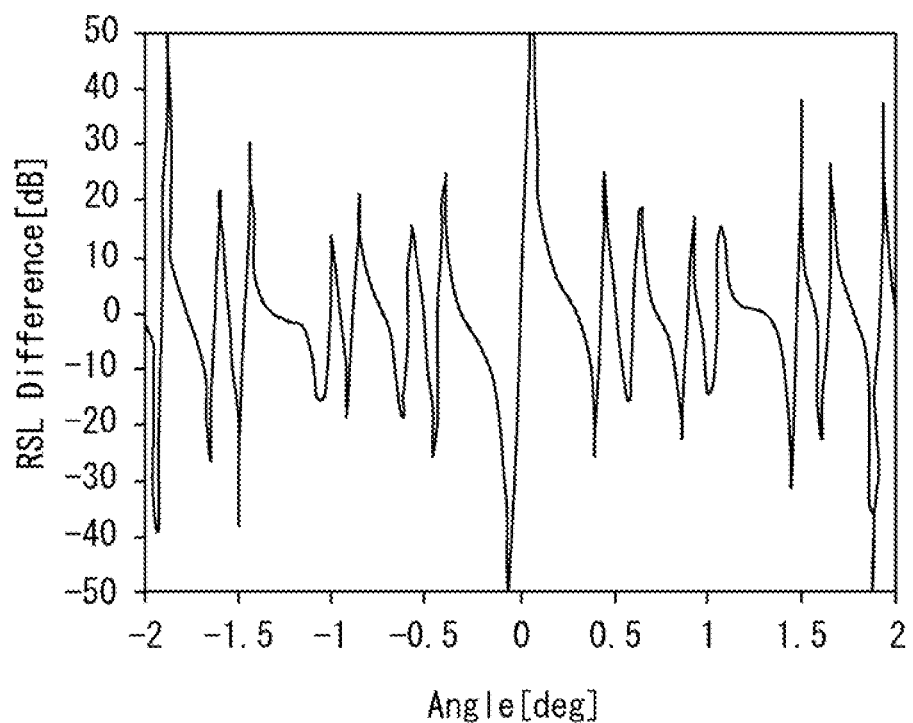
FIG. 6 is a graph for explaining polarities of differences between the amplitude components of two OAM reception weights.
Figure 7:
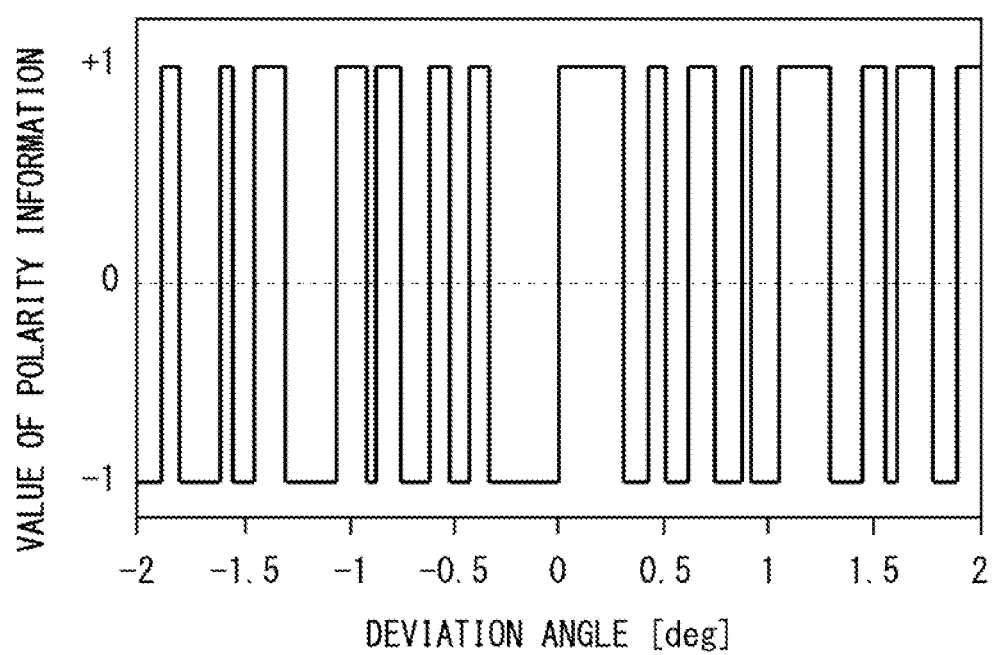
FIG. 7 is a graph for explaining values of polarity information.

The polarity of a difference between the amplitude components of two OAM reception weights will be described hereinafter. FIG. 5 shows an example of a transmitting-side UCA antenna Tx and a receiving-side UCA antenna Rx. FIG. 6 is a graph for explaining polarities of differences between the amplitude components of two OAM reception weights. FIG. 7 is a graph for explaining values of polarity information.

In FIG. 5, the transmitting-side UCA antenna Tx including eight transmitting antenna elements #1 to #8, and the receiving-side UCA antenna Rx including eight receiving antenna elements #1 to #8 are shown. As shown in FIG. 5, a Y-axis connecting the positions of the transmitting antenna elements #1 and #5, an X-axis connecting the positions of the transmitting antenna elements #3 and #7, and a Z-axis perpendicular to the XY-plane and passing through the center of the rotational symmetry are defined. That is, the direction of a transmitting-side axis misalignment around the Y-axis corresponds to the above-described "first polarity information", and the direction of a transmitting-side axis misalignment around the X-axis corresponds to the above-described "second polarity information".

FIG. 6 shows a simulation result of a case where N=8 and the mode is a mode 0. In this simulation model, the transmitting and receiving antenna elements #1 and #5 are disposed on the Y-axis, and the transmitting and receiving antenna elements #3 and #7 are disposed on the X-axis. The horizontal axis in FIG. 6 indicates the angle of the rotation of the transmitting-side UCA antenna Tx around the vertical axis (the Y-axis) (i.e., a transmitting-side axis misalignment in the azimuth direction). This vertical axis (the Y-axis) is an axis connecting the positions of the transmitting antenna elements #1 and #5, which are opposed to each other with the array center CN therebetween, in the transmitting-side UCA antenna Tx. The vertical axis in FIG. 6 indicates differences between the logarithms of the amplitude components of two OAM reception weights corresponding to the receiving antenna elements #3 and #7 (i.e., values obtained by subtracting the logarithm of the amplitude component of the OAM reception weight corresponding to the receiving antenna element #7 from the logarithm of the amplitude component of the OAM reception weight corresponding to the receiving antenna element #3). When true values are used instead of logarithmic values, the ratio between the amplitude components of two OAM weights are used. Further, the distance between the transmitting-side UCA antenna Tx and the receiving-side UCA antenna Rx is set to 300 meters.

As can be understood from the simulation result shown in FIG. 6, the polarity (plus or minus) of the values on the vertical axis changes around 0° on the horizontal axis. The direction of the transmitting-side axis misalignment can be specified based on this polarity. Note that since the detection is based on the phase relationship, similar output changes periodically appear. There are a plurality of control stable points (points where the positive/negative of the angle of the axis misalignment coincides with the positive/negative of the value on the vertical axis) within the width of 3 dB of the beam due to the directivity of the UCA antenna element. There is only one true stable point, and it is necessary to adjust the beam direction to or near the true stable point in the initial setting of the apparatus. However, once the control for compensation for the transmission axis misalignment starts to be performed, the beam emitting direction continuously (or successively) coincides with the transmission reference beam direction. Therefore, even when the angle of the transmission axis misalignment exceeds one cycle (a pair of positive and negative) of the detection characteristic shown in FIG. 6 due to the temporal variations, the transmission axis misalignment is corrected.

FIG. 7 shows the behavior of the value of the polarity information that is formed in the information forming unit 41 when the behavior of the difference between the amplitude components of two OAM reception weights, such as the simulation result shown in FIG. 6, is obtained.

Referring to FIG. 4 again, the transmission control unit 42 performs control so as to transmit "information corresponding to the transmitting-side axis misalignment" to the OAM mode-multiplexing transmitting apparatus 10. For example, the transmission control unit 42 forms a feedback signal including "information corresponding to the transmitting-side axis misalignment", and outputs the formed feedback signal to the feedback signal transmitting unit 34.

The feedback signal transmitting unit 34 transmits the feedback signal to the OAM mode-multiplexing transmitting apparatus 10.

As described above, according to the second example embodiment, in the control apparatus 20, the acquisition unit 21 acquires "information corresponding to a transmitting-side axis misalignment" transmitted from the OAM mode-multiplexing receiving apparatus 30. The beam control unit 22 controls the beam of the transmitting-side UCA antenna 14 by controlling the phases of N OAM mode-multiplexing signals based on the acquired "information corresponding to the transmitting-side axis misalignment".

By the above-described configuration of the control apparatus 20, it is possible to acquire "information corresponding to a transmitting-side axis misalignment", and control, based on the acquired "information corresponding to the transmitting-side axis misalignment", the beam by controlling the phase of each of the elements in the same manner for all of the four OAM mode signals. In this way, it is possible to carry out control for compensating for a deterioration in characteristics of OAM mode-multiplexing transmission caused by an axis misalignment.

The "information corresponding to a transmitting-side axis misalignment" is formed, for example, based on OAM reception weights used for OAM reception processing performed in the OAM mode-multiplexing receiving apparatus 30 (which will be described later). For example, the "information corresponding to a transmitting-side axis misalignment" is the "polarity of a difference between logarithmically-expressed amplitude components of two OAM reception weights".

By the above-described configuration of the control apparatus 20, it is possible to form information that accurately indicates the direction of the "transmitting-side axis misalignment". Note that the OAM reception weight used in the OAM reception processing is adaptively controlled so that the OAM mode signal is demultiplexed without causing interference therebetween, and as a result, the OAM reception weight corresponds (i.e., conforms) to the reception signal level of the OAM mode in the receiving antenna element 31. Therefore, the "difference between logarithmically-expressed amplitude components of two OAM reception weights" corresponds to the difference between the reception signal levels of the two receiving antenna elements 31 corresponding to the two OAM reception weights. The reason why the characteristics of OAM mode-multiplexing transmission significantly deteriorate when an axis misalignment of the transmission UCA occurs is that when the channel matrix between the transmission/reception UCAs is combined with the transmitting-side signal processing matrix, there is a large difference between the reception signal levels as observed on the basis of the OAM mode at each of the elements of the reception UCA. The reception signals from the respective elements, including singles having very low level, are combined while assigning weights so that no inter-modal interference occurs, and as a result, the noise enhancement significantly increases and hence the characteristics deteriorate. Therefore, by observing the above-described "reception signal level on the basis of the OAM mode at each of the elements of the reception UCA", it becomes possible to detect an axis misalignment of the transmission UCA. It is possible to output signals corresponding to reception signal levels from receivers directly connected to respective reception UCA elements, but these signals are signals in which all the OAM modes are combined. It is impossible to output a desired reception signal level on the basis of the OAM mode from each receiver. However, this desired signal corresponds to the weight for the OAM signal demultiplexing by the adaptive control. That is, one OAM demultiplexing circuit is prepared for each of the modes. Further, amplitude values for weights for inputs from elements having low reception signal levels increase, and those for inputs from elements having high reception signal levels decrease. Further, this phenomenon is independent between the AZ direction (the rotation around the Y-axis) and the EL direction (the rotation around the X-axis). As a result, it is possible to form information that accurately indicates the direction of the "transmitting-side axis misalignment" from the OAM reception weights used for the OAM reception processing by the adaptive control.

The "information corresponding to a transmitting-side axis misalignment" includes "first polarity information" and "second polarity information". The "first polarity information" indicates the polarity of a difference between two OAM reception weights corresponding to the second receiving-side antenna pair (the receiving antenna elements 31-2 and 31-4) of the receiving-side UCA 31. Further, the "second polarity information" indicates the polarity of a difference between the two other OAM reception weights corresponding to a first receiving-side antenna pair (receiving antenna elements 31-1 and 31-3) of the receiving-side UCA 31.

By the above-described configuration of the control apparatus 20, it is possible to acquire "first polarity information" indicating the direction of the transmitting-side axis misalignment around the axis AX1 (the first axis) extending in the direction connecting the positions of the transmitting antenna elements 14-1 and 14-3 and "second polarity information" indicating the direction of the transmitting-side axis misalignment around the axis AX2 (the second axis) extending in the direction connecting the positions of the transmitting antenna elements 14-2 and 14-4. Further, it is possible to control the beam by controlling the phases of N OAM mode-multiplexing signals based on the "first polarity information" and the "second polarity information". As a result, it is possible to carry out control for accurately compensating for a deterioration in characteristics of OAM mode-multiplexing transmission caused by an axis misalignment.

Further, in the control apparatus 40, the information forming unit 41 forms "information corresponding to a transmitting-side axis misalignment" based on two OAM reception weights included in an OAM reception weight vector corresponding to a predetermined one OAM mode. The transmission control unit 42 performs control so as to transmit "information corresponding to the transmitting-side axis misalignment" to the OAM mode-multiplexing transmitting apparatus 10.

By the above-described configuration of the control apparatus 40, it is possible to transmit the "information corresponding to the transmitting-side axis misalignment" to the OAM mode-multiplexing transmitting apparatus 10. In this way, the control apparatus 20 can acquire "information corresponding to the transmitting-side axis misalignment", and control the beam by controlling the phases of the four OAM mode-multiplexing signals based on the acquired "information corresponding to the transmitting-side axis misalignment". In this way, it is possible to carry out control for compensating for a deterioration in characteristics of OAM mode-multiplexing transmission caused by an axis misalignment.

The "information corresponding to a transmitting-side axis misalignment" includes first polarity information indicating the polarity of a difference between two OAM reception weights corresponding to the second receiving-side antenna pair including two receiving antenna elements 31-2 and 31-4, and second polarity information indicating the polarity of a difference between the two other OAM reception weights corresponding to the first receiving-side antenna pair including the two other receiving antenna elements 31-1 and 31-3.

By the above-described configuration of the control apparatus 40, it is possible to transmit "first polarity information" indicating the direction of a transmitting-side axis misalignment around the axis AX1 (the first axis) and "second polarity information" indicating the direction of a transmitting-side axis misalignment around the axis AX2 (the second axis) to the OAM mode-multiplexing transmitting apparatus 10. In this way, the control apparatus 20 can acquire "first polarity information" and "second polarity information", and control the beam by controlling the phases of the four OAM mode-multiplexing signals based on the acquired "first polarity information" and the "second polarity information". As a result, it is possible to carry out control for accurately compensating for a deterioration in characteristics of OAM mode-multiplexing transmission caused by an axis misalignment.

Note that a control method is performed by the control apparatus 40. The control method includes forming information corresponding to a transmitting-side axis misalignment, which is a deviation of the array plane of the transmitting-side UCA 14 from the reference plane of the transmitting-side UCA 14, based on the OAM reception weights included in the OAM reception weight vector, and transmitting the formed information corresponding to the transmitting-side axis misalignment to the OAM mode-multiplexing transmitting apparatus 10.

Third Example Embodiment

A third example embodiment relates to an example embodiment in which an OAM mode-multiplexing transmitting apparatus detects a value of a transmitting-side axis misalignment.

Configuration Example of OAM Mode-multiplexing Transmitting Apparatus

Figure 8:
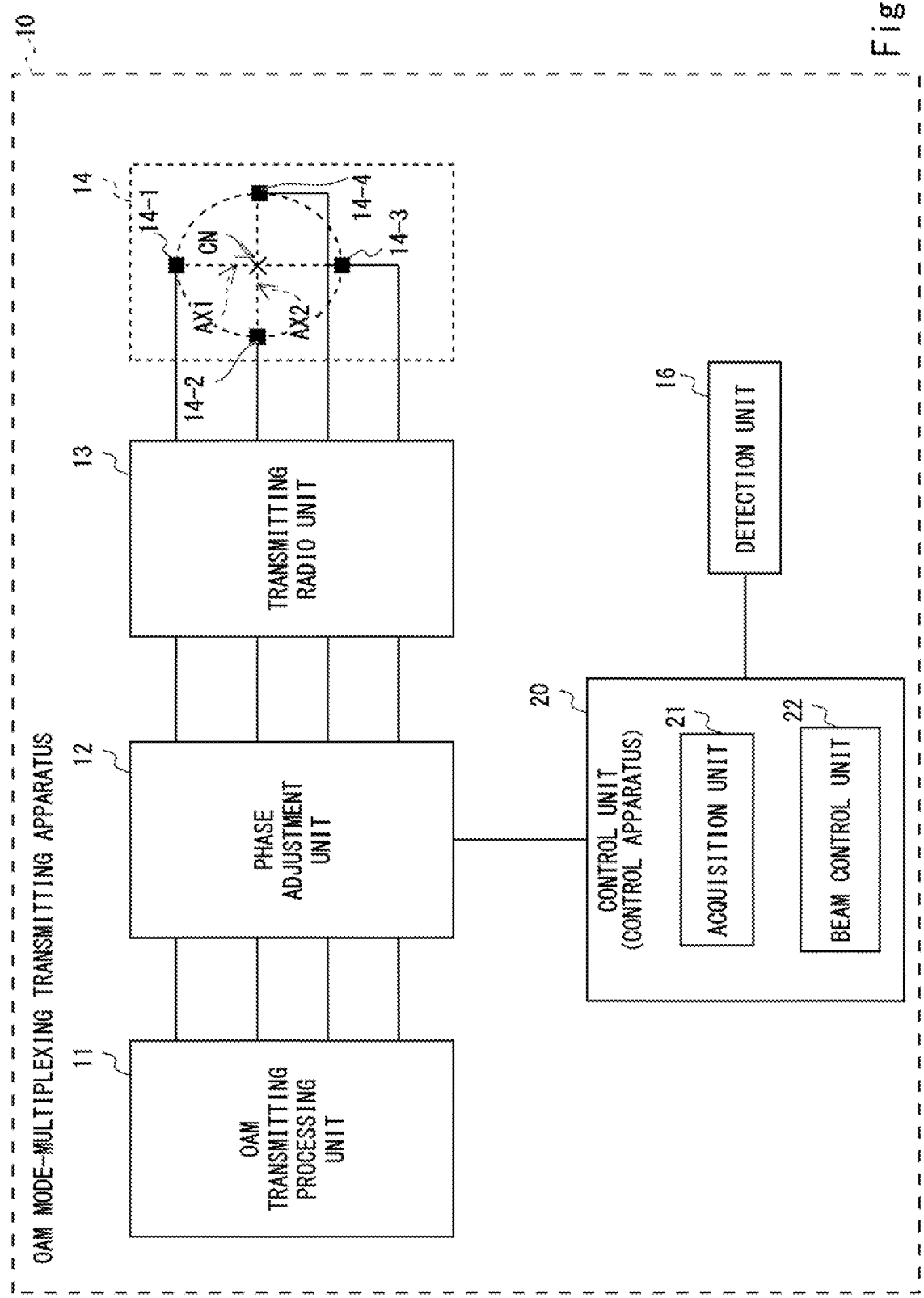
FIG. 8 is a block diagram showing an example of an OAM mode-multiplexing transmitting apparatus according to a third example embodiment.

FIG. 8 is a block diagram showing an example of an OAM mode-multiplexing transmitting apparatus according to the third example embodiment. In FIG. 8, the OAM mode-multiplexing transmitting apparatus 10 according to the third example embodiment includes an OAM transmitting processing unit 11, a phase adjustment unit 12, a transmitting radio unit 13, a UCA (Uniform Circular Array) antenna 14, a detection unit 16, and a control unit (control apparatus) 20.

The detection unit 16 detects a "value of a transmitting-side axis misalignment".

The detection unit 16 may be, for example, an accelerometer. In this case, the detection unit 16 may detect a first acceleration value around the axis AX1 (the first axis) and a second acceleration value around the axis AX2 (the second axis) as amounts corresponding to "values of a transmitting-side axis misalignment". When the accelerometer can directly output differences between the direction of gravity (the vertical direction) and the directions of the two axes, information about the differences can be directly used as the first and second "values of the transmitting-side axis misalignment".

Further, the detection unit 16 may be, for example, a camera (visible light, infrared light). In this case, the detection unit 16 may form a photographed image while also photographing (observing) a reference point present outside the OAM mode-multiplexing transmitting apparatus 10. This photographed image may contain an image of the reference point that is shown at a position displaced from the initial position thereof by a distance corresponding to a transmitting-side axis misalignment.

The acquisition unit 21 according to the third example embodiment acquires the "value of the transmitting-side axis misalignment" from the detection unit 16.

In the beam control unit 22 according to the third example embodiment, in the case where the detection unit 16 is an accelerometer, it is possible to calculate the deviation of the position of the detection unit 16 by second-order integrating the values detected by the detection unit 16 (the first and second acceleration values). Further, from the result of the calculation, the current deviated array plane (the direction in which the current deviated array plane faces) of the transmitting-side UCA 14 is calculated. Then, the beam control unit 22 forms a phase adjustment signal for adjusting the direction of the beam by an amount equivalent to the angle between the deviated array plane in the calculated current position (the direction in which the current deviated array plane faces) and the reference plane of the transmitting-side UCA 14 (the direction in which the reference plane of the transmitting-side UCA 14 faces). Then, the beam control unit 22 outputs the formed phase adjustment signal to the phase adjustment unit 12.

Further, in the case where the detection unit 16 is a camera (visible light, infrared light), the beam control unit 22 may calculate the value of the deviation around the axis AX1 (the first axis) and the value of the deviation around the axis AX2 (the second axis) by performing image processing on the photographed image including the reference point formed by the detection unit 16. These calculated values of the deviations around the axis AX1 (the first axis) and the axis AX2 (the second axis) correspond to the current deviated array plane (the direction in which the current deviated array plane faces) of the transmitting-side UCA 14. Then, the beam control unit 22 forms a phase adjustment signal for adjusting the direction of the beam by an amount equivalent to the angle between the calculated current deviated array plane (the direction in which the current deviated array plane faces) and the reference plane of the transmitting-side UCA 14 (the direction in which the reference plane of the transmitting-side UCA 14 faces). Then, the beam control unit 22 outputs the formed phase adjustment signal to the phase adjustment unit 12.

Here, the coordinates of one transmission UCA element in the ideal state is represented as $(x_0, y_0, z_0)$. Coordinates that are obtained by applying a rotation θ (Y-axis) in the AZ direction to the aforementioned coordinates are represented as $(x_1, y_1, z_1)$, and coordinates that are obtained by further applying a rotation ψ (X-axis) in the EL direction to the obtained coordinates are represented as $(x_2, y_2, z_2)$ (see below-shown Expressions (3) and (4)). The coordinates of each element after the rotations around the two axes are $(x_2, y_2, z_2)$. Regarding the angle, the clockwise direction relative to the positive direction of the rotation axis is defines as the positive direction. Note that the discussion here are based on the coordinates shown in FIG. 5.

[Expression 3]

$$\begin{pmatrix} x_1 \\ z_1 \end{pmatrix} = \begin{pmatrix} \cos\theta & \sin\theta \\ -\sin\theta & \cos\theta \end{pmatrix} \begin{pmatrix} x_0 \\ z_0 \end{pmatrix}, y_1 = y_0 \qquad (3)$$

[Expression 4]

$$\begin{pmatrix} y_2 \\ z_2 \end{pmatrix} = \begin{pmatrix} \cos\psi & \sin\psi \\ -\sin\psi & \cos\psi \end{pmatrix} \begin{pmatrix} y_1 \\ z_1 \end{pmatrix}, x_2 = x_1 \qquad (4)$$

Then, a phase difference φ (see below-shown Expressions (5) and (6)) corresponding to a distance d between $(x_2, y_2, z_2)$ and $(x_0, y_0, z_0)$ is applied to each of the phase shifters 12A. [Expression 5]

$$\Phi = 2\pi d/\lambda \qquad (5)$$

In the Expression (5), k is the wavelength (the inverse of the frequency) of the transmission signal (the carrier wave). [Expression 6]

$$d = \sqrt{(x_2 - x_0)^2 + (y_2 - y_0)^2 + (z_2 - z_0)^2} \qquad (6)$$

Note that when the deviation angle is minute, a phase difference corresponding to a distance d' expressed by coordinates on the Z-axis alone (see below-shown Expression (7)) may be simply used. [Expression 7]

$$d' = \sqrt{(z_2 - z_0)^2} = |z_2 - z_0| \qquad (7)$$

As described above, according to the third example embodiment, in the control apparatus 20, the acquisition unit 21 acquires "information corresponding to a transmitting-side axis misalignment" detected by the detection unit 16 of the OAM mode-multiplexing transmitting apparatus 10. The beam control unit 22 controls the beam of the transmitting-side UCA antenna 14 by controlling the phases of N OAM mode-multiplexing signals based on the acquired "information corresponding to the transmitting-side axis misalignment".

By the above-described configuration of the control apparatus 20, it is possible to acquire "information corresponding to a transmitting-side axis misalignment", and to control the beam by controlling the phases of four OAM mode-multiplexing signals based on the acquired "information corresponding to the transmitting-side axis misalignment". In this way, it is possible to carry out control for compensating for a deterioration in characteristics of OAM mode-multiplexing transmission caused by an axis misalignment.

Fourth Example Embodiment

A fourth example embodiment relates to an example embodiment in which a "phase shifter phase value used in a phase adjustment in a phase shifter" is transmitted from an OAM mode-multiplexing receiving apparatus. Note that, as a comparison, in the second example embodiment, "information corresponding to a transmitting-side axis misalignment" is transmitted from the OAM mode-multiplexing receiving apparatus, and a phase adjustment signal (corresponding to the above-described phase shifter phase value) is formed from the "information corresponding to the transmitting-side axis misalignment" in the OAM mode-multiplexing transmitting apparatus.

Configuration Example of OAM Mode-multiplexing Receiving Apparatus

Figure 9:
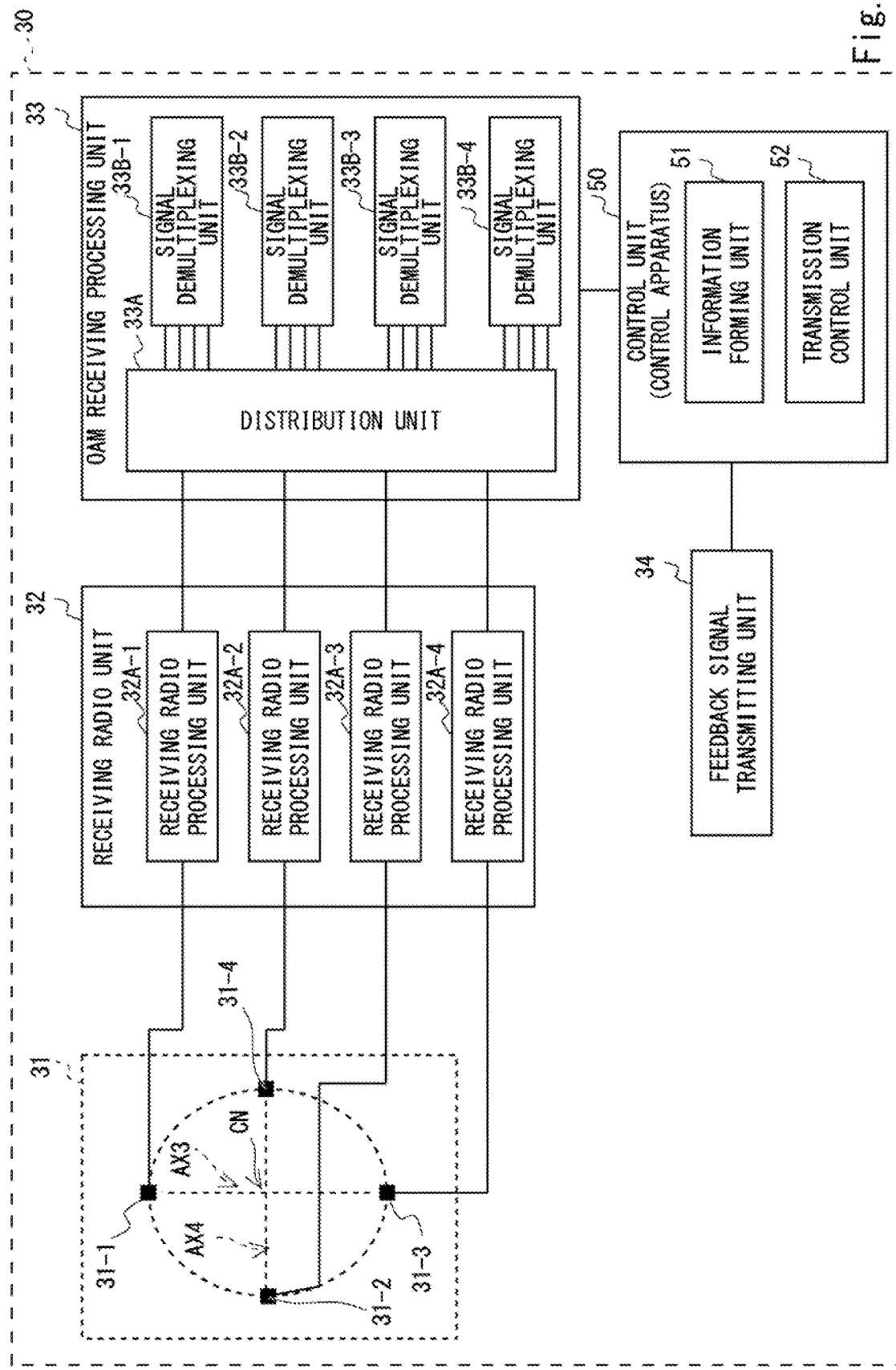
FIG. 9 is a block diagram showing an example of an OAM mode-multiplexing receiving apparatus according to a fourth example embodiment.

FIG. 9 is a block diagram showing an example of an OAM mode-multiplexing receiving apparatus according to the fourth example embodiment. In FIG. 9, the OAM mode-multiplexing receiving apparatus 30 according to the fourth example embodiment includes a control unit (control apparatus) 50. Note that the following description will be given on the assumption that the control unit (control apparatus) 50 is included in the OAM mode-multiplexing receiving apparatus 30, but the present disclosure is not limited to this example. For example, the control unit (control apparatus) 50 is an apparatus separate from the OAM mode-multiplexing receiving apparatus 30, and may be used by connecting it to the OAM mode-multiplexing receiving apparatus 30 through a cable or wirelessly.

As shown in FIG. 9, the control unit 50 includes an information forming unit 51 and a transmission control unit 52.

Similarly to the information forming unit 41 according to the second example embodiment, the information forming unit 51 calculates a difference between the amplitude components of two OAM reception weights corresponding to the "second receiving-side antenna pair (the receiving antenna elements 31-2 and 31-4)", and thereby specifies the polarity (positive or negative) of the difference. This specified polarity is called a "first polarity value". Further, the information forming unit 51 calculates a difference between the amplitude components of the two other OAM reception weights corresponding to the "first receiving-side antenna pair (the receiving antenna elements 31-1 and 31-3)", and thereby specifies the polarity (positive or negative) of the difference. This specified polarity is called a "second polarity value". Then, the information forming unit 51 obtains a "first phase shifter phase value" by integrating (cumulatively adding) values each of which is obtained by multiplying the "first polarity value" specified at each processing timing (i.e., a respective processing timing) by a "correction step value". Further, the information forming unit 51 obtains a "second phase shifter phase value" by integrating (cumulatively adding) values each of which is obtained by multiplying the "second polarity value" specified at each processing timing (i.e., a respective processing timing) by the "correction step value". Note that the "first polarity value" and the "second polarity value" correspond to the "information corresponding to a transmitting-side axis misalignment" in the second example embodiment.

Figure 10:
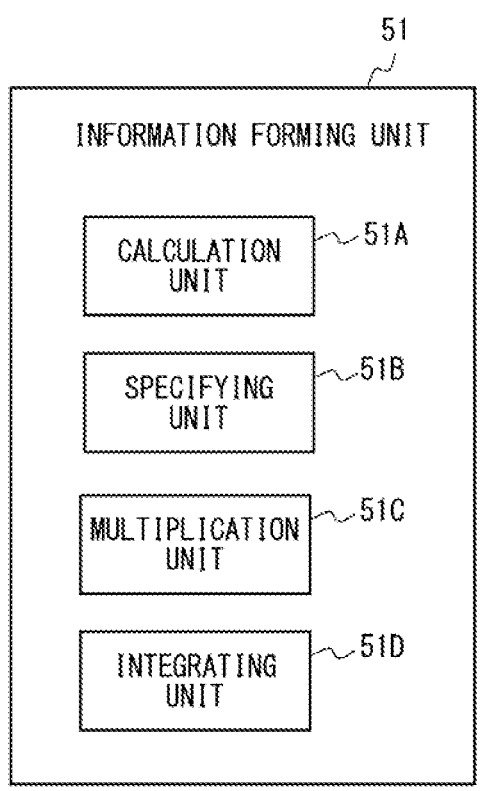
FIG. 10 is a block diagram showing an example of an information forming unit according to the fourth example embodiment.

FIG. 10 is a block diagram showing an example of the information forming unit according to the fourth example embodiment. In FIG. 10, the information forming unit 51 includes a calculation unit 51A, a specifying unit 51B, a multiplication unit 51C, and an integrating unit 51D.

The calculation unit 51A calculates a difference between the amplitude components of two OAM reception weights corresponding to the "second receiving-side antenna pair (the receiving antenna elements 31-2 and 31-4)". Then, the specifying unit 51B specifies the polarity of this difference calculated by the calculation unit 51A (i.e., calculates the "first polarity value").

Further, the calculation unit 51A calculates a difference between the amplitude components of the two other OAM reception weights corresponding to the "first receiving-side antenna pair (the receiving antenna elements 31-1 and 31-3)". Then, the specifying unit 51B specifies the polarity of this difference calculated by the calculation unit 51A (i.e., calculates the "second polarity value").

The multiplication unit 51C multiplies the above-described first polarity value by the "correction step value". Then, the integrating unit 51D integrates (cumulatively adds) the values obtained in the multiplication unit 51C, and thereby obtains the "value of first phase shifter phase information".

For example, the multiplication unit 51C and the integrating unit 51D update the "value of the first phase shifter phase information" at regular time intervals based on the below-shown Expression (8). Note that although an example in which the multiplication unit 51C and the integrating unit 51D update the "value of the first phase shifter phase information" is shown in the fourth example embodiment, the "value of the first phase shifter phase information" may be updated by the holding unit and the update unit as in the second example embodiment. That is, the information forming unit 51 may include a holding unit and an update unit in place of the multiplication unit 51C and the integrating unit 51D. [Expression 8]

$$\Phi_{AZ\,t}=\Phi_{AZ\,t-1}-\Delta C_{AZ} \qquad (8)$$

In the Expression (8), $\varphi AZ_{t-1}$ is the "value of the first phase shifter phase information" before the update, and $\varphi_{AZt}$ is the "value of the first phase shifter phase information" after the update. $\Delta$ is a fixed adjustment step width. $C_{AZ}$ is a "first polarity value (e.g., +1 or −1)".

Note that when the first polarity value has a negative value, (−Δ×C) has a positive value. That is, when the first polarity value indicates a transmitting-side axis misalignment in the negative direction, the current "value of the first phase shifter phase information" is updated by adding (−Δ×C) having a positive value to the current "value of the first phase shifter phase information" in order to cancel out the transmitting-side axis misalignment.

Further, the multiplication unit 51C multiplies the above-described second polarity value by the "correction step value". Then, the integrating unit 51D integrates (cumulatively adds) the values obtained in the multiplication unit 51C, and thereby obtains the "value of second phase shifter phase information".

For example, the multiplication unit 51C and the integrating unit 51D update the "value of the second phase shifter phase information" at regular time intervals based on the below-shown Expression (9). Note that although an example in which the multiplication unit 51C and the integrating unit 51D update the "value of the second phase shifter phase information" is shown in the fourth example embodiment, the "value of the second phase shifter phase information" may be updated by the holding unit and the update unit as in the second example embodiment. That is, the information forming unit 51 may include a holding unit and an update unit in place of the multiplication unit 51C and the integrating unit 51D.
[Expression 9]

$$\Phi_{EL\,t}=\Phi_{EL\,t-1}-\Delta C_{EL} \qquad (9)$$

In the Expression 9, $\varphi_{ELt-1}$ is the "value of the second phase shifter phase information" before the update, and $\varphi_{EL1}$ is the "value of the second phase shifter phase information" after the update. $\Delta$ is a fixed adjustment step width. $C_{EL}$ is a "second polarity value (e.g., +1 or −1)".

Note that when the control loop is closed and the control is thereby stabilized, i.e., when the axis misalignment of the transmission UCA is corrected by the control of the beam direction, the probability that each of the "first polarity value" and the "second polarity value", each of which is a binary signal, has a value of −1 and the probability that it has a value of +1 become equal to each other. As a result, the output of the integrating unit 51D has a constant value. This output of the integrating unit 51D serves as the phase value of the phase shifter 12, it means that the control of the beam direction has been determined (or fixed).

The transmission control unit 52 performs control so as to transmit the "value of the first phase shifter phase information" and the "value of the second phase shifter phase information" to the OAM mode-multiplexing transmitting apparatus 10. For example, the transmission control unit 42 forms a feedback signal including the "value of the first phase shifter phase information" and the "value of the second phase shifter phase information", and outputs the formed feedback signal to the feedback signal transmitting unit 34. Note that since the "first polarity value" and the "second polarity value" are obtained from every reception signal, all the reception signals contribute to the generation of the "value of the first phase shifter phase information" and the "value of the second phase shifter phase information". However, in the case where the bandwidth for the feedback sent to the transmitting side is limited, instead of feeding back all the "values of the first phase shifter phase information" and the "values of the second phase shifter phase information" formed by the information forming unit 51 to the transmitting side, only some of the "values of the first phase shifter phase information" and some of the "values of the second phase shifter phase information", both of which are periodically selected, may be fed back to the transmitting side.

The feedback signal transmitting unit 34 transmits the feedback signal to the OAM mode-multiplexing transmitting apparatus 10.

Configuration Example of OAM Mode-multiplexing Transmitting Apparatus

Figure 11:
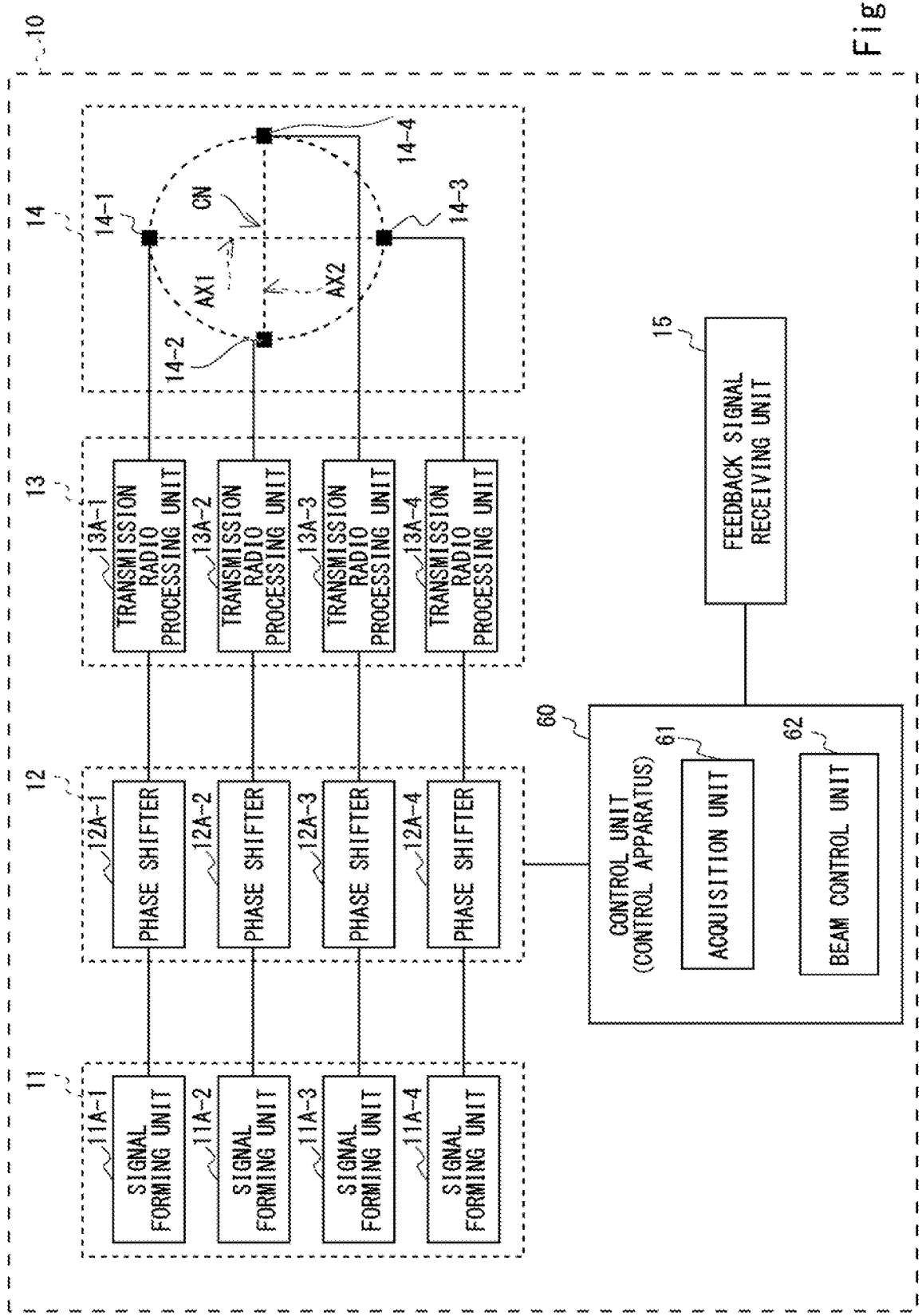
FIG. 11 is a block diagram showing an example of an OAM mode-multiplexing transmitting apparatus according to the fourth example embodiment.

FIG. 11 is a block diagram showing an example of an OAM mode-multiplexing transmitting apparatus according to the fourth example embodiment. In FIG. 11, the OAM mode-multiplexing transmitting apparatus 10 according to the fourth example embodiment includes a control unit (control apparatus) 60. Note that the following description will be given on the assumption that the control unit (control apparatus) 60 is included in the OAM mode-multiplexing transmitting apparatus 10, but the present disclosure is not limited to this example. For example, the control unit (control apparatus) 60 is an apparatus separate from the OAM mode-multiplexing transmitting apparatus 10, and may be used by connecting it to the OAM mode-multiplexing transmitting apparatus 10 through a cable or wirelessly.

As shown in FIG. 11, the control unit 60 includes an acquisition unit 61 and a beam control unit 62.

The acquisition unit 61 acquires the "value of the first phase shifter phase information" and the "value of the second phase shifter phase information" from the feedback signal received in the feedback signal receiving unit 15.

Note that the "value of the first phase shifter phase information" acquired in the acquisition unit 61 can be regarded as the value of the first phase shifter phase information for the antenna element 14-2, and the "value of the second phase shifter phase information" acquired in the acquisition unit 61 can be regarded as the value of the second phase shifter phase information for the antenna element 14-1. The values of the first phase shifter phase information and the values of the second phase shifter phase information for the other antenna elements 14 can be calculated by the conversion because the positions of the antenna elements 14-2 and 14-1 and the positions of the other antenna elements 14 have a linear relationship therebetween.

The beam control unit 62 calculates the value of the first phase shifter phase information for each of the antenna elements 14 from the "value of the first phase shifter phase information" acquired in the acquisition unit 61. Further, the beam control unit 62 calculates the "value of the second phase shifter phase information" for each of the antenna elements 14 from the "value of the second phase shifter phase information" acquired in the acquisition unit 61. Then, the beam control unit 62 obtains, for each of the phase shifters 12A corresponding to a respective one of the antenna elements 14, the "phase shifter phase value" by adding, for each of the antenna elements 14, the "value of the first phase shifter phase information" and the "value of the second phase shifter phase information" for the antenna element.

Figure 12:
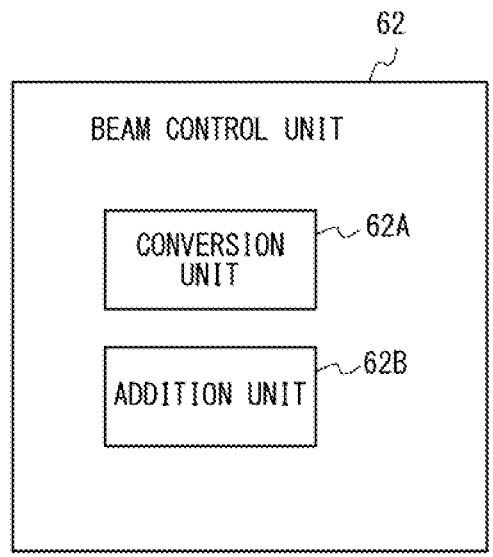
FIG. 12 is a block diagram showing an example of a beam control unit according to the fourth example embodiment.

FIG. 12 is a block diagram showing an example of the beam control unit according to the fourth example embodiment. In FIG. 12, the beam control unit 62 includes a conversion unit 62A and an addition unit 62B.

The conversion unit 62A calculates the "value of the first phase shifter phase information" for each of the antenna elements 14 from the "value of the first phase shifter phase information" acquired in the acquisition unit 61. The conversion unit 62A calculates the "value of the second phase shifter phase information" for each of the antenna elements 14 from the "value of the second phase shifter phase information" acquired in the acquisition unit 61.

For example, assuming that the "value of the first phase shifter phase information" acquired in the acquisition unit 61 is a control value for the transmitting antenna element 14-2, the control values for the transmitting antenna elements 14-1 and 14-3 are obtained by multiplying the "value of the first phase shifter phase information" for the transmitting antenna element 14-2 by zero based on the positional relationship between the transmitting antenna element 14-2 and the transmitting antenna element 14-1 (the transmitting antenna element 14-3). Similarly, the control value for the transmitting antenna element 14-4 is obtained by multiplying the "value of the first phase shifter phase information" for the transmitting antenna element 14-2 by −1.

Similarly, assuming that the "value of the second phase shifter phase information" acquired in the acquisition unit 61 is a control value for the transmitting antenna element 14-1, the control values for the transmitting antenna elements 14-2 and 14-4 are obtained by multiplying the "value of the second phase shifter phase information" for the transmitting antenna element 14-1 by zero based on the positional relationship between the transmitting antenna element 14-1 and the transmitting antenna element 14-2 (the transmitting antenna element 14-4). Similarly, the control value for the transmitting antenna element 14-3 is obtained by multiplying the "value of the second phase shifter phase information" for the transmitting antenna element 14-1 by −1.

As described above, the conversion unit 62A converts the "value of the first phase shifter phase information" for one antenna element 14 and the "value of the second phase shifter phase information" for another antenna element 14 based on the positional relationship of the antenna elements 14, and thereby calculates the "value of the first phase shifter phase information" and the "value of the second phase shifter phase information" for each of all the antenna elements 14. Note that the same holds true even when the number of elements N is greater than four. In the case of N=8 where there are antenna elements that are not disposed on either of two orthogonal axes, calculation such as a multiplication by 1/N2 will be performed, but it can be obtained by the conversion by using a multiplier. No conversion is necessary for the "value of the first phase shifter phase information" for the transmitting antenna element 14-2 and the "value of the second phase shifter phase information" for the transmitting antenna element 14-1.

Then, the addition unit 62B obtains, for each of the phase shifters 12A corresponding to a respective one of the antenna elements 14, the "phase shifter phase value" by adding, for each of the antenna elements 14, the "value of the first phase shifter phase information" and the "value of the second phase shifter phase information" for the antenna element. That is, as shown in below-shown Expression (10), by adding the "value of the first phase shifter phase information" and the "value of the second phase shifter phase information" for an antenna element **14-*i*, a phase shifter phase value $\varphi_i$ for a phase shifter 12A-*i* corresponding to the antenna element 14-*i*** is obtained. [Expression 10]

$$\Phi_i = \Phi_{AZ\ i} + \Phi_{EL\ i} \tag{10}$$

For example, the "phase shifter phase value" obtained by adding the "value of the first phase shifter phase information" and the "value of the second phase shifter phase information" for the antenna element 14-1 is output to the phase shifter 12A-1.

Modified Example

The above description has been given under the assumption that, similarly to the information forming unit 41 according to the second example embodiment, the information forming unit 51 calculates a difference between the amplitude components of two OAM reception weights corresponding to the "second receiving-side antenna pair (the receiving antenna elements 31-2 and 31-4)", and specifies the polarity (positive, negative (i.e., a binary value)) of the difference. This configuration may be modified as described below.

That is, the information forming unit 51 calculates a difference (an analog amount) between the amplitude components of two OAM reception weights corresponding to the "second receiving-side antenna pair (the receiving antenna elements 31-2 and 31-4)". This calculated difference between the amplitude components is called a "first difference value". Further, the information forming unit 51 calculates a difference (an analog amount) between the amplitude components of the two other OAM reception weights corresponding to the "first receiving-side antenna pair (the receiving antenna elements 31-1 and 31-3)". This calculated difference between the amplitude components is called a "second difference value". Then, the information forming unit 51 obtains the "first phase shifter phase value" by integrating (cumulatively adding) values each of which is obtained by multiplying the "first difference value" specified at each processing timing (i.e., a respective processing timing) (i.e., a respective processing timing) by a "correction step value". Further, the information forming unit 51 obtains the "second phase shifter phase value" by integrating (cumulatively adding) values each of which is obtained by multiplying the "second difference value" specified at each processing timing (i.e., a respective processing timing) by the "correction step value". The value of the "correction step value" used in the above-described calculation differs from the value of the above-described correction step value by which the "first polarity value" and the "second polarity value" are multiplied.

Note that, in the modified example, the first and second polarity values do no need to be specified, and hence the information forming unit 51 does not need to include the specifying unit 51B.

Other Example Embodiment

Figure 13:
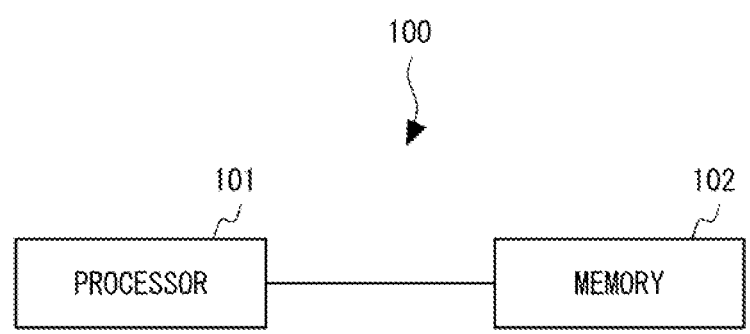
FIG. 13 shows an example of a hardware configuration of a control apparatus.

FIG. 13 shows an example of a hardware configuration of a control apparatus. In FIG. 13, a control apparatus 100 includes a processor 101 and a memory 102. The processor 101 may be, for example, a microprocessor, an MPU (Micro Processing Unit), or a CPU (Central Processing Unit). The processor 101 may include a plurality of processors. The memory 102 is composed of a combination of a volatile memory and a nonvolatile memory. The memory 102 may include a storage disposed remotely from the processor 101. In this case, the processor 101 may access the memory 102 through an I/O interface (not shown).

Each of the control apparatuses 20, 40, 50 and 60 of the first to fourth example embodiments can have the hardware configuration shown in FIG. 13. Each of the acquisition units 21 and 61, the beam control units 22 and 62, the information forming units 41 and 51, and the transmission control units 42 and 52 of the control apparatuses 20, 40, 50 and 60 according to the first to fourth example embodiments may be implemented by having the processor 101 load and execute a program stored in the memory 102. The program can be stored and supplied to each of the control apparatuses 20, 40, 50 and 60 by using various types of non-transitory computer readable media. Examples of non-transitory computer readable media include magnetic recording media (e.g., flexible disks, magnetic tapes, and hard disk drives) and magneto-optical recording media (e.g., magneto-optical disks). Examples of non-transitory computer readable media also include CD-ROM (Read Only Memory), CD-R, and CD-R/W. Examples of non-transitory computer readable media also include semiconductor memories. Examples of semiconductor memories include mask ROM, PROM (Programmable ROM), EPROM (Erasable PROM), flash ROM, and RAM (Random Access Memory). Further, the program may also be supplied to each of the control apparatuses 20, 40, 50 and 60 by various types of transitory computer readable media. Examples of transitory computer readable media include electrical signals, optical signals, and electromagnetic waves. The transitory computer readable media can supply the program to each of the control apparatuses 20, 40, 50 and 60 through a wired channel such as an electric wire and an optical fiber, or through a wireless channel.

The first to the fourth example embodiments can be combined as desirable by one of ordinary skill in the art.

According to present disclosure, it is possible to provide a control apparatus, an OAM mode-multiplexing transmitting apparatus, an OAM mode-multiplexing receiving apparatus, a control method, and a non-transitory computer readable medium capable of providing an automatic control method for compensating for a deterioration in characteristics of OAM mode-multiplexing transmission caused by an axis misalignment through control of transmission beams.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

The whole or part of the example embodiments disclosed above can be described as, but not limited to, the following supplementary notes.

(Supplementary Note 1)

A control apparatus configured to control an OAM (Orbital Angular Momentum) mode-multiplexing transmitting apparatus configured to communicate with an OAM mode-multiplexing receiving apparatus, wherein the OAM mode-multiplexing transmitting apparatus comprises:

a transmitting-side UCA (Uniform Circular Array) including a plurality of transmitting antenna elements arranged in a rotational-symmetrical manner and at equal distances from a center of the rotational symmetry, where the number N of transmitting antenna elements is equal to or greater than four;

fixed-weight OAM transmission processing means for forming a plurality of OAM (Orbital Angular Momentum) mode-multiplexing signals each of which is transmitted from a respective one of the plurality of transmitting antenna elements, where the number of OAM mode-multiplexing signals is equal to or less than N; and phase adjustment means for adjusting phases of the plurality of OAM mode-multiplexing signals, the phase adjustment means being disposed between the plurality of transmitting antenna elements and the OAM transmission processing means, and the control apparatus comprises:

acquisition means for acquiring information corresponding to a transmitting-side axis misalignment, the transmitting-side axis misalignment being a deviation of an array plane of the transmitting-side UCA from a reference plane of the transmitting-side UCA; and beam control means for outputting a signal for controlling the phase adjustment means based on the information corresponding to the acquired transmitting-side axis misalignment.

(Supplementary Note 2)

The control apparatus described in Supplementary note 1, wherein the acquisition means acquires the information corresponding to the transmitting-side axis misalignment transmitted from the OAM mode-multiplexing receiving apparatus, and the information corresponding to the transmitting-side axis misalignment is formed based on an OAM reception weight output from adaptively-controlled OAM receiving processing means in the OAM mode-multiplexing receiving apparatus.

(Supplementary Note 3)

The control apparatus described in Supplementary note 2, wherein the information corresponding to the transmitting-side axis misalignment includes a polarity of a difference between two OAM reception weights.

(Supplementary Note 4)

The control apparatus described in Supplementary note 3, wherein the transmitting-side UCA includes a first transmitting-side antenna pair including two vertically-arranged transmitting antenna elements disposed so to be opposed to each other with the center of the rotational symmetry therebetween in the plurality of transmitting antenna elements, and a second transmitting-side antenna pair including two other horizontally-arranged transmitting antenna elements disposed on a second axis intersecting a first axis on which the two transmitting antenna elements are disposed, the receiving-side UCA of the OAM mode-multiplexing receiving apparatus includes a first receiving-side antenna pair including two receiving antenna elements corresponding to the first transmitting-side antenna pair and disposed on a third axis, and a second receiving-side antenna pair including two other receiving antenna elements corresponding to the second transmitting-side antenna pair and disposed on a fourth axis intersecting the third axis, and the information corresponding to the transmitting-side axis misalignment includes first polarity information indicating a polarity of a difference between two OAM reception weights corresponding to the second receiving-side antenna pair, and second polarity information indicating a polarity of a difference between two other OAM reception weights corresponding to the first receiving-side antenna pair.

(Supplementary Note 5)

The control apparatus described in any one of Supplementary notes 1 to 4, wherein the beam control means calculates a direction adjustment reference plane used for beam adjustment based on the information corresponding to the transmitting-side axis misalignment, forms a phase adjustment signal for shifting a beam emitting direction of the transmitting-side UCA from a reference beam direction by an amount equivalent to an angle from an initial direction adjustment reference plane to the calculated direction adjustment reference plane, and outputs the formed phase adjustment signal to the phase adjustment means.

(Supplementary Note 6)

The control apparatus described in Supplementary note 4, wherein the beam control means comprises:

holding means for holding a first angle adjustment value around the first axis and a second angle adjustment value around the second axis;

updating means for updating the first angle adjustment value based on the first polarity information and updating the second angle adjustment value based on the second polarity information; and forming means for forming a phase adjustment signal for shifting a beam emitting direction of the transmitting-side UCA from a reference beam direction based on the updated first and second angle adjustment values and initial values of the first and second angle adjustment values.

(Supplementary Note 7)

The control apparatus described in Supplementary note 6, wherein the first axis is orthogonal to the second axis.

(Supplementary Note 8)

The control apparatus described in Supplementary note 1, wherein the OAM mode-multiplexing transmitting apparatus comprises detection means for detecting a value of the transmitting-side axis misalignment, and the acquisition means acquires the value of the transmitting-side axis misalignment as the information corresponding to the transmitting-side axis misalignment.

(Supplementary Note 9)

The control apparatus described in Supplementary note 8, wherein the detection means is an accelerometer, the acquisition means acquires a detected value of the accelerometer, and the beam control means calculates a deviated array plane of the transmitting-side UCA by second-order integrating the detected value, forms a phase adjustment signal for adjusting the beam emitting direction by an amount equivalent to an angle between the calculated deviated array plane and the reference plane, and outputs the formed phase adjustment signal to the phase adjustment means.

(Supplementary Note 10)

The control apparatus described in Supplementary note 8, wherein the detection means is a camera, the acquisition means acquires an image taken by the camera, the image including a reference point shown therein, and the beam control means calculates a deviated array plane of the transmitting-side UCA based on the acquired image, forms a phase adjustment signal for adjusting the beam emitting direction by an amount equivalent to an angle between the calculated deviated array plane and the reference plane, and outputs the formed phase adjustment signal to the phase adjustment means.

(Supplementary Note 11)

An OAM mode-multiplexing transmitting apparatus comprising a control apparatus described in any one of Supplementary notes 1 to 10.

(Supplementary Note 12)

A control apparatus configured to control an OAM (Orbital Angular Momentum) mode-multiplexing receiving apparatus, wherein the OAM mode-multiplexing receiving apparatus comprises:

a receiving-side UCA (Uniform Circular Array) including a plurality of receiving antenna elements arranged in a rotational-symmetrical manner and at equal distances from a center of the rotational symmetry; and an adaptively-controlled OAM (Orbital Angular Momentum) receiving processing means for extracting a reception signal corresponding to one OAM mode by multiplying a plurality of reception signals by an OAM reception weight vector, each of the plurality of reception signals corresponding to a respective one of the plurality of receiving antenna elements, and the OAM reception weight vector being a weight vector obtained as a result of adaptive control corresponding to the one OAM mode, and the control apparatus comprises:

information forming means for forming information corresponding to a transmitting-side axis misalignment based on an OAM reception weight amplitude component included in the OAM reception weight vector, the transmitting-side axis misalignment being a deviation of an array plane of the transmitting-side UCA of an OAM mode-multiplexing transmitting apparatus from a reference plane of the transmitting-side UCA; and transmission control means for transmitting information corresponding to the transmitting-side axis misalignment to the OAM mode-multiplexing transmitting apparatus.

(Supplementary Note 13)

The control apparatus described in Supplementary note 12 wherein the information corresponding to the transmitting-side axis misalignment includes a polarity of a difference between two OAM reception weight amplitude components.

(Supplementary Note 14)

The control apparatus described in Supplementary note 13, wherein the transmitting-side UCA includes a first transmitting-side antenna pair including two vertically-arranged transmitting antenna elements disposed so to be opposed to each other with the center of the rotational symmetry therebetween, and a second transmitting-side antenna pair including two other horizontally-arranged transmitting antenna elements disposed on a second axis intersecting a first axis on which the two transmitting antenna elements are disposed, the receiving-side UCA includes a first receiving-side antenna pair including two receiving antenna elements corresponding to the first transmitting-side antenna pair and disposed on a third axis, and a second receiving-side antenna pair including two other receiving antenna elements corresponding to the second transmitting-side antenna pair and disposed on a fourth axis intersecting the third axis, and the information corresponding to the transmitting-side axis misalignment includes first polarity information indicating a polarity of a difference between two OAM reception weight amplitude components corresponding to the second receiving-side antenna pair, and second polarity information indicating a polarity of a difference between two other OAM reception weight amplitude components corresponding to the first receiving-side antenna pair.

(Supplementary Note 15)

The control apparatus described in Supplementary note 14, wherein a direction in which the two receiving antenna elements included in the first receiving-side antenna pair are arranged and a direction in which two other receiving antenna elements included in the second receiving-side antenna pair are arranged are perpendicular to each other.

(Supplementary Note 16)

The control apparatus described in Supplementary note 14 or 15, wherein the information forming means specifies a polarity of a difference between the two OAM reception weight amplitude components, and specifies a polarity of a difference between amplitude components of the two other OAM reception weights.

(Supplementary Note 17)

An OAM mode-multiplexing receiving apparatus comprising a control apparatus described in any one of Supplementary notes 12 to 16.

(Supplementary Note 18)

A control method performed by a control apparatus configured to control an OAM (Orbital Angular Momentum) mode-multiplexing transmitting apparatus configured to communicate with an OAM mode-multiplexing receiving apparatus, wherein the OAM mode-multiplexing transmitting apparatus comprises:

a transmitting-side UCA (Uniform Circular Array) including a plurality of transmitting antenna elements arranged in a rotational-symmetrical manner and at equal distances from a center of the rotational symmetry, where the number N of transmitting antenna elements is equal to or greater than four;

fixed-weight OAM transmission processing means for forming a plurality of OAM (Orbital Angular Momentum) mode-multiplexing signals each of which is transmitted from a respective one of the plurality of transmitting antenna elements, where the number of OAM mode-multiplexing signals is equal to or less than N; and phase adjustment means for adjusting phases of the plurality of OAM mode-multiplexing signals, the phase adjustment means being disposed between the plurality of transmitting antenna elements and the OAM transmission processing means, and the control method comprises:

acquiring information corresponding to a transmitting-side axis misalignment, the transmitting-side axis misalignment being a deviation of an array plane of the transmitting-side UCA from a reference plane of the transmitting-side UCA; and outputting a signal for controlling the phase adjustment means based on the information corresponding to the acquired transmitting-side axis misalignment.

(Supplementary Note 19)

The control method described in Supplementary note 18, wherein the acquiring includes acquiring the information corresponding to the transmitting-side axis misalignment transmitted from the OAM mode-multiplexing receiving apparatus, and the information corresponding to the transmitting-side axis misalignment is formed based on an OAM reception weight output from adaptively-controlled OAM receiving processing means in the OAM mode-multiplexing receiving apparatus.

(Supplementary Note 20)

A control method performed by a control apparatus configured to control an OAM (Orbital Angular Momentum) mode-multiplexing receiving apparatus, wherein the OAM mode-multiplexing receiving apparatus comprises:

a receiving-side UCA (Uniform Circular Array) including a plurality of receiving antenna elements arranged in a rotational-symmetrical manner and at equal distances from a center of the rotational symmetry; and an adaptively-controlled OAM (Orbital Angular Momentum) receiving processing means for extracting a reception signal corresponding to one OAM mode by multiplying a plurality of reception signals by an OAM reception weight vector, each of the plurality of reception signals corresponding to a respective one of the plurality of receiving antenna elements, and the OAM reception weight vector being a weight vector obtained as a result of adaptive control corresponding to the one OAM mode, and the control method comprises:

forming information corresponding to a transmitting-side axis misalignment based on an OAM reception weight amplitude component included in the OAM reception weight vector, the transmitting-side axis misalignment being a deviation of an array plane of the transmitting-side UCA of an OAM mode-multiplexing transmitting apparatus from a reference plane of the transmitting-side UCA; and transmitting information corresponding to the transmitting-side axis misalignment to the OAM mode-multiplexing transmitting apparatus.

(Supplementary Note 21)

The control method described in Supplementary note 20, wherein the information corresponding to the transmitting-side axis misalignment includes a polarity of a difference between two OAM reception weight amplitude components.

(Supplementary Note 22)

A non-transitory computer readable medium storing a program for causing a control apparatus configured to control an OAM (Orbital Angular Momentum) mode-multiplexing transmitting apparatus configured to communicate with an OAM mode-multiplexing receiving apparatus to perform processing, wherein the OAM mode-multiplexing transmitting apparatus comprises:

a transmitting-side UCA (Uniform Circular Array) including a plurality of transmitting antenna elements arranged in a rotational-symmetrical manner and at equal distances from a center of the rotational symmetry, where the number N of transmitting antenna elements is equal to or greater than four;

fixed-weight OAM transmission processing means for forming a plurality of OAM (Orbital Angular Momentum) mode-multiplexing signals each of which is transmitted from a respective one of the plurality of transmitting antenna elements, where the number of OAM mode-multiplexing signals is equal to or less than N; and phase adjustment means for adjusting phases of the plurality of OAM mode-multiplexing signals, the phase adjustment means being disposed between the plurality of transmitting antenna elements and the OAM transmission processing means, and the process comprises:

acquiring information corresponding to a transmitting-side axis misalignment, the transmitting-side axis misalignment being a deviation of an array plane of the transmitting-side UCA from a reference plane of the transmitting-side UCA; and outputting a signal for controlling the phase adjustment means based on the information corresponding to the acquired transmitting-side axis misalignment.

(Supplementary Note 23)

The non-transitory computer readable medium described in Supplementary note 22, wherein the acquiring includes acquiring the information corresponding to the transmitting-side axis misalignment transmitted from the OAM mode-multiplexing receiving apparatus, and the information corresponding to the transmitting-side axis misalignment is formed based on an OAM reception weight output from adaptively-controlled OAM receiving processing means in the OAM mode-multiplexing receiving apparatus.

(Supplementary Note 24)

A non-transitory computer readable medium storing a program for causing a control apparatus configured to control an OAM (Orbital Angular Momentum) mode-multiplexing receiving apparatus to perform processing, wherein the OAM mode-multiplexing receiving apparatus includes:

a receiving-side UCA (Uniform Circular Array) including a plurality of receiving antenna elements arranged in a rotational-symmetrical manner and at equal distances from a center of the rotational symmetry; and an adaptively-controlled OAM (Orbital Angular Momentum) receiving processing means for extracting a reception signal corresponding to one OAM mode by multiplying a plurality of reception signals by an OAM reception weight vector, each of the plurality of reception signals corresponding to a respective one of the plurality of receiving antenna elements, and the OAM reception weight vector being a weight vector obtained as a result of adaptive control corresponding to the one OAM mode, and the process comprises:

forming information corresponding to a transmitting-side axis misalignment based on an OAM reception weight amplitude component included in the OAM reception weight vector, the transmitting-side axis misalignment being a deviation of an array plane of the transmitting-side UCA of an OAM mode-multiplexing transmitting apparatus from a reference plane of the transmitting-side UCA; and transmitting information corresponding to the transmitting-side axis misalignment to the OAM mode-multiplexing transmitting apparatus.

(Supplementary Note 25)

The non-transitory computer readable medium described in Supplementary note 24, wherein the information corresponding to the transmitting-side axis misalignment includes a polarity of a difference between two OAM reception weight amplitude components.

(Supplementary Note 26)

A transmission system comprising an OAM (Orbital Angular Momentum) mode-multiplexing transmitting apparatus and an OAM mode-multiplexing receiving apparatus, wherein the OAM mode-multiplexing transmitting apparatus comprises:

a transmitting-side UCA (Uniform Circular Array) including a plurality of transmitting antenna elements arranged in a rotational-symmetrical manner and at equal distances from a center of the rotational symmetry, where the number N of transmitting antenna elements is equal to or greater than four;

fixed-weight OAM transmission processing means for forming a plurality of OAM (Orbital Angular Momentum) mode-multiplexing signals each of which is transmitted from a respective one of the plurality of transmitting antenna elements, where the number of OAM mode-multiplexing signals is equal to or less than N;

phase adjustment means for adjusting phases of the plurality of OAM mode-multiplexing signals, the phase adjustment means being disposed between the plurality of transmitting antenna elements and the OAM transmission processing means;

acquisition means for acquiring information corresponding to a transmitting-side axis misalignment, the transmitting-side axis misalignment being a deviation of an array plane of the transmitting-side UCA from a reference plane of the transmitting-side UCA; and beam control means for outputting a signal for controlling the phase adjustment means based on the information corresponding to the acquired transmitting-side axis misalignment, and the OAM mode-multiplexing receiving apparatus comprises:

a receiving-side UCA including a plurality of receiving antenna elements arranged in a rotational-symmetrical manner and at equal distances from a center of the rotational symmetry;

an adaptively-controlled OAM (Orbital Angular Momentum) receiving processing means for extracting a reception signal corresponding to one OAM mode by multiplying a plurality of reception signals by an OAM reception weight vector, each of the plurality of reception signals corresponding to a respective one of the plurality of receiving antenna elements, and the OAM reception weight vector being a weight vector obtained as a result of adaptive control corresponding to the one OAM mode, information forming means for forming information corresponding to the transmitting-side axis misalignment based on an OAM reception weight amplitude component included in the OAM reception weight vector; and transmission control means for transmitting information corresponding to the transmitting-side axis misalignment to the OAM mode-multiplexing transmitting apparatus.

(Supplementary Note 27)

The transmission system described in Supplementary note 26, wherein the information corresponding to the transmitting-side axis misalignment includes a polarity of a difference between two OAM reception weight amplitude components.

(Supplementary Note 28)

A control apparatus configured to control an OAM (Orbital Angular Momentum) mode-multiplexing transmitting apparatus configured to communicate with an OAM mode-multiplexing receiving apparatus, wherein the OAM mode-multiplexing transmitting apparatus comprises:

a transmitting-side UCA (Uniform Circular Array) including a plurality of transmitting antenna elements arranged in a rotational-symmetrical manner and at equal distances from a center of the rotational symmetry, where the number N of transmitting antenna elements is equal to or greater than four;

fixed-weight OAM transmission processing means for forming a plurality of OAM (Orbital Angular Momentum) mode-multiplexing signals each of which is transmitted from a respective one of the plurality of transmitting antenna elements, where the number of OAM mode-multiplexing signals is equal to or less than N; and phase adjustment means for adjusting phases of the plurality of OAM mode-multiplexing signals, the phase adjustment means being disposed between the plurality of transmitting antenna elements and the OAM transmission processing means, and the control apparatus comprises:

acquisition means for acquiring a pair of a value of first phase shifter phase information and a value of second phase shifter phase information from the OAM mode-multiplexing receiving apparatus;

conversion means for calculating the value of the first phase shifter phase information for each of the transmitting antenna elements from the acquired value of the first phase shifter phase information, and calculating the value of the second phase shifter phase information for each of the transmitting antenna elements from the acquired value of the second phase shifter phase information; and addition means for adding, for each of the transmitting antenna elements, the value of the first phase shifter phase information and the value of the second phase shifter phase information, and thereby calculating, for each of the transmitting antenna elements, a phase shift value used for a phase adjustment of an OAM mode-multiplexing signal corresponding to the transmitting antenna element, and the pair of the value of the first phase shifter phase information and the value of the second phase shifter phase information is calculated, in the OAM mode-multiplexing receiving apparatus, based on information corresponding to a transmitting-side axis misalignment, the information corresponding to the transmitting-side axis misalignment being a deviation of an array plane of the transmitting-side UCA from a reference plane of the transmitting-side UCA.

(Supplementary Note 29)

The control apparatus described in Supplementary note 28, wherein the transmitting-side UCA includes a first transmitting-side antenna pair including two vertically-arranged transmitting antenna elements disposed so to be opposed to each other with the center of the rotational symmetry therebetween in the plurality of transmitting antenna elements, and a second transmitting-side antenna pair including two other horizontally-arranged transmitting antenna elements disposed on a second axis intersecting a first axis on which the two transmitting antenna elements are disposed, the receiving-side UCA of the OAM mode-multiplexing receiving apparatus includes a first receiving-side antenna pair including two receiving antenna elements corresponding to the first transmitting-side antenna pair and disposed on a third axis, and a second receiving-side antenna pair including two other receiving antenna elements corresponding to the second transmitting-side antenna pair and disposed on a fourth axis intersecting the third axis, and the information corresponding to the transmitting-side axis misalignment includes a first polarity value indicating a polarity of a difference between two OAM reception weights corresponding to the second receiving-side antenna pair, and a second polarity value indicating a polarity of a difference between two other OAM reception weights corresponding to the first receiving-side antenna pair.

(Supplementary Note 30)

A control apparatus configured to control an OAM (Orbital Angular Momentum) mode-multiplexing receiving apparatus, wherein the OAM mode-multiplexing receiving apparatus comprises:
a receiving-side UCA (Uniform Circular Array) including a plurality of receiving antenna elements arranged in a rotational-symmetrical manner and at equal distances from a center of the rotational symmetry; and
an adaptively-controlled OAM (Orbital Angular Momentum) receiving processing means for extracting a reception signal corresponding to one OAM mode by multiplying a plurality of reception signals by an OAM reception weight vector, each of the plurality of reception signals corresponding to a respective one of the plurality of receiving antenna elements, and the OAM reception weight vector being a weight vector obtained as a result of adaptive control corresponding to the one OAM mode, and
the control apparatus comprises:
information forming means for specifying information corresponding to a transmitting-side axis misalignment based on an OAM reception weight amplitude component included in the OAM reception weight vector, and calculating a pair of a value of first phase shifter phase information and a value of second phase shifter phase information based on the information corresponding to the transmitting-side axis misalignment, the information corresponding to the transmitting-side axis misalignment being a deviation of an array plane of the transmitting-side UCA of the OAM mode-multiplexing transmitting apparatus from a reference plane of the transmitting-side UCA; and
transmission control means for transmitting the pair of the value of the first phase shifter phase information and the value of the second phase shifter phase information to the OAM mode-multiplexing transmitting apparatus.

(Supplementary Note 31)

The control apparatus described in Supplementary note 30, wherein the transmitting-side UCA includes a first transmitting-side antenna pair including two vertically-arranged transmitting antenna elements disposed so to be opposed to each other with the center of the rotational symmetry therebetween, and a second transmitting-side antenna pair including two other horizontally-arranged transmitting antenna elements disposed on a second axis intersecting a first axis on which the two transmitting antenna elements are disposed, the receiving-side UCA includes a first receiving-side antenna pair including two receiving antenna elements corresponding to the first transmitting-side antenna pair and disposed on a third axis, and a second receiving-side antenna pair including two other receiving antenna elements corresponding to the second transmitting-side antenna pair and disposed on a fourth axis intersecting the third axis, the information corresponding to the transmitting-side axis misalignment includes a first polarity value indicating a polarity of a difference between two OAM reception weight amplitude components corresponding to the second receiving-side antenna pair, and a second polarity value indicating a polarity of a difference between two other OAM reception weight amplitude components corresponding to the first receiving-side antenna pair, and the information forming means calculates the value of the first phase shifter phase information by integrating a value obtained by multiplying the first polarity value by a correction step value, and calculates the value of the second phase shifter phase information by integrating a value obtained by multiplying the second polarity value by the correction step value.

What is claimed is:

1. A control apparatus configured to control an OAM (Orbital Angular Momentum) mode-multiplexing transmitting apparatus configured to communicate with an OAM mode-multiplexing receiving apparatus, wherein the OAM mode-multiplexing transmitting apparatus comprises:
a transmitting-side UCA (Uniform Circular Array) including a plurality of transmitting antenna elements arranged in a rotational-symmetrical manner and at equal distances from a center of the rotational symmetry, where the number N of transmitting antenna elements is equal to or greater than four;
a fixed-weight OAM transmission processing unit configured to form a plurality of OAM (Orbital Angular Momentum) mode-multiplexing signals each of which is transmitted from a respective one of the plurality of transmitting antenna elements, where the number of OAM mode-multiplexing signals is equal to or less than N; and
a phase adjustment unit configured to adjust phases of the plurality of OAM mode-multiplexing signals, the phase adjustment unit being disposed between the plurality of transmitting antenna elements and the OAM transmission processing unit, and
the control apparatus comprises:
at least one memory storing instructions, and
at least one processor configured to execute, according to the instructions, a process comprising:
acquiring a pair of a value of first phase shifter phase information and a value of second phase shifter phase information from the OAM mode-multiplexing receiving apparatus;
first calculating the value of the first phase shifter phase information for each of the transmitting antenna elements from the acquired value of the first phase shifter phase information, and second calculating the value of the second phase shifter phase information for each of the transmitting antenna elements from the acquired value of the second phase shifter phase information; and
adding, for each of the transmitting antenna elements, the value of the first phase shifter phase information and the value of the second phase shifter phase information, and thereby third calculating, for each of the transmitting antenna elements, a phase shift value used for a phase adjustment of an OAM mode-multiplexing signal corresponding to the transmitting antenna element, and
the pair of the value of the first phase shifter phase information and the value of the second phase shifter phase information is calculated, in the OAM mode-multiplexing receiving apparatus, based on information corresponding to a transmitting-side axis misalignment, the information corresponding to the transmitting-side axis misalignment being a deviation of an array plane of the transmitting-side UCA from a reference plane of the transmitting-side UCA.

2. The control apparatus according to claim 1, wherein
the transmitting-side UCA includes a first transmitting-side antenna pair including two vertically-arranged transmitting antenna elements disposed so to be opposed to each other with the center of the rotational symmetry therebetween in the plurality of transmitting antenna elements, and a second transmitting-side antenna pair including two other horizontally-arranged transmitting antenna elements disposed on a second axis intersecting a first axis on which the two transmitting antenna elements are disposed, the receiving-side UCA of the OAM mode-multiplexing receiving apparatus includes a first receiving-side antenna pair including two receiving antenna elements corresponding to the first transmitting-side antenna pair and disposed on a third axis, and a second receiving-side antenna pair including two other receiving antenna elements corresponding to the second transmitting-side antenna pair and disposed on a fourth axis intersecting the third axis, and the information corresponding to the transmitting-side axis misalignment includes a first polarity value indicating a polarity of a difference between two OAM reception weights corresponding to the second receiving-side antenna pair, and a second polarity value indicating a polarity of a difference between two other OAM reception weights corresponding to the first receiving-side antenna pair.

3. The control apparatus according to claim 2, wherein each of the first and second polarity values has one of two values.

4. The control apparatus according to claim 1, wherein
the transmitting-side UCA includes a first transmitting-side antenna pair including two vertically-arranged transmitting antenna elements disposed so to be opposed to each other with the center of the rotational symmetry therebetween in the plurality of transmitting antenna elements, and a second transmitting-side antenna pair including two other horizontally-arranged transmitting antenna elements disposed on a second axis intersecting a first axis on which the two transmitting antenna elements are disposed, the receiving-side UCA of the OAM mode-multiplexing receiving apparatus includes a first receiving-side antenna pair including two receiving antenna elements corresponding to the first transmitting-side antenna pair and disposed on a third axis, and a second receiving-side antenna pair including two other receiving antenna elements corresponding to the second transmitting-side antenna pair and disposed on a fourth axis intersecting the third axis, and the information corresponding to the transmitting-side axis misalignment includes a first difference value indicating a difference between two OAM reception weights corresponding to the second receiving-side antenna pair, and a second difference value indicating a difference between two other OAM reception weights corresponding to the first receiving-side antenna pair.

5. The control apparatus according to claim 1, wherein
the acquired value of the first phase shifter phase information and the value of the second phase shifter phase information correspond to one transmitting antenna element of the transmitting-side UCA, and the first calculating and the second calculating include converting the acquired value of the first phase shifter phase information and the value of the second phase shifter phase information into the value of the first phase shifter phase information and the value of the second phase shifter phase information corresponding to another transmitting antenna of the transmitting-side UCA other than the one transmitting antenna based on a linear relationship between a position of the other transmitting antenna and a position of the one transmitting antenna.

6. A control apparatus configured to control an OAM (Orbital Angular Momentum) mode-multiplexing receiving apparatus, wherein
the OAM mode-multiplexing receiving apparatus comprises:
a receiving-side UCA (Uniform Circular Array) including a plurality of receiving antenna elements arranged in a rotational-symmetrical manner and at equal distances from a center of the rotational symmetry; and
an adaptively-controlled OAM (Orbital Angular Momentum) receiving processing unit configured to extract a reception signal corresponding to one OAM mode by multiplying a plurality of reception signals by an OAM reception weight vector, each of the plurality of reception signals corresponding to a respective one of the plurality of receiving antenna elements, and the OAM reception weight vector being a weight vector obtained as a result of adaptive control corresponding to the one OAM mode, and the control apparatus comprises:
at least one memory storing instructions, and
at least one processor configured to execute, according to the instructions, a process comprising:
specifying information corresponding to a transmitting-side axis misalignment based on an OAM reception weight amplitude component included in the OAM reception weight vector, and calculating a pair of a value of first phase shifter phase information and a value of second phase shifter phase information based on the information corresponding to the transmitting-side axis misalignment, the information corresponding to the transmitting-side axis misalignment being a deviation of an array plane of the transmitting-side UCA of the OAM mode-multiplexing transmitting apparatus from a reference plane of the transmitting-side UCA; and
transmitting the pair of the value of the first phase shifter phase information and the value of the second phase shifter phase information to the OAM mode-multiplexing transmitting apparatus.

7. The control apparatus according to claim 6, wherein
the transmitting-side UCA includes a first transmitting-side antenna pair including two vertically-arranged transmitting antenna elements disposed so to be opposed to each other with the center of the rotational symmetry therebetween, and a second transmitting-side antenna pair including two other horizontally-arranged transmitting antenna elements disposed on a second axis intersecting a first axis on which the two transmitting antenna elements are disposed, the receiving-side UCA includes a first receiving-side antenna pair including two receiving antenna elements corresponding to the first transmitting-side antenna pair and disposed on a third axis, and a second receiving-side antenna pair including two other receiving antenna elements corresponding to the second transmitting-side antenna pair and disposed on a fourth axis intersecting the third axis, the information corresponding to the transmitting-side axis misalignment includes a first polarity value indicating a polarity of a difference between two OAM reception weight amplitude components corresponding to the second receiving-side antenna pair, and a second polarity value indicating a polarity of a difference between two other OAM reception weight amplitude components corresponding to the first receiving-side antenna pair, and the calculating the pair includes calculating the value of the first phase shifter phase information by integrating a value obtained by multiplying the first polarity value by a correction step value, and calculating the value of the second phase shifter phase information by integrating a value obtained by multiplying the second polarity value by the correction step value.

8. The control apparatus according to claim 7, wherein each of the first and second polarity values has one of two values.

9. The control apparatus according to claim 6, wherein
the transmitting-side UCA includes a first transmitting-side antenna pair including two vertically-arranged transmitting antenna elements disposed so to be opposed to each other with the center of the rotational symmetry therebetween, and a second transmitting-side antenna pair including two other horizontally-arranged transmitting antenna elements disposed on a second axis intersecting a first axis on which the two transmitting antenna elements are disposed, the receiving-side UCA includes a first receiving-side antenna pair including two receiving antenna elements corresponding to the first transmitting-side antenna pair and disposed on a third axis, and a second receiving-side antenna pair including two other receiving antenna elements corresponding to the second transmitting-side antenna pair and disposed on a fourth axis intersecting the third axis, the information corresponding to the transmitting-side axis misalignment includes a first difference value indicating a difference between two OAM reception weight amplitude components corresponding to the second receiving-side antenna pair, and a second difference value indicating a difference between two other OAM reception weight amplitude components corresponding to the first receiving-side antenna pair, and the calculating the pair includes calculating the value of the first phase shifter phase information by integrating a value obtained by multiplying the first difference value by a correction step value, and calculating the value of the second phase shifter phase information by integrating a value obtained by multiplying the second difference value by the correction step value.

10. A control apparatus configured to control an OAM (Orbital Angular Momentum) mode-multiplexing transmitting apparatus configured to communicate with an OAM mode-multiplexing receiving apparatus, wherein
the OAM mode-multiplexing transmitting apparatus comprises:
a transmitting-side UCA (Uniform Circular Array) including a plurality of transmitting antenna elements arranged in a rotational-symmetrical manner and at equal distances from a center of the rotational symmetry, where the number N of transmitting antenna elements is equal to or greater than four;
a fixed-weight OAM transmission processing unit configured to form a plurality of OAM (Orbital Angular Momentum) mode-multiplexing signals each of which is transmitted from a respective one of the plurality of transmitting antenna elements, where the number of OAM mode-multiplexing signals is equal to or less than N; and
a phase adjustment unit configured to adjust phases of the plurality of OAM mode-multiplexing signals, the phase adjustment unit being disposed between the plurality of transmitting antenna elements and the OAM transmission processing unit, and the control apparatus comprises:
at least one memory storing instructions, and
at least one processor configured to execute, according to the instructions, a process comprising:
acquiring information corresponding to a transmitting-side axis misalignment, the transmitting-side axis misalignment being a deviation of an array plane of the transmitting-side UCA from a reference plane of the transmitting-side UCA; and
outputting a signal for controlling the phase adjustment unit based on the information corresponding to the acquired transmitting-side axis misalignment.

11. The control apparatus according to claim 10, wherein
the acquiring includes acquiring the information corresponding to the transmitting-side axis misalignment transmitted from the OAM mode-multiplexing receiving apparatus, and the information corresponding to the transmitting-side axis misalignment is formed based on an OAM reception weight output from adaptively-controlled OAM receiving processing in the OAM mode-multiplexing receiving apparatus.

12. The control apparatus according to claim 11, wherein the information corresponding to the transmitting-side axis misalignment includes a polarity of a difference between two OAM reception weights.

13. The control apparatus according to claim 12, wherein
the transmitting-side UCA includes a first transmitting-side antenna pair including two vertically-arranged transmitting antenna elements disposed so to be opposed to each other with the center of the rotational symmetry therebetween in the plurality of transmitting antenna elements, and a second transmitting-side antenna pair including two other horizontally-arranged transmitting antenna elements disposed on a second axis intersecting a first axis on which the two transmitting antenna elements are disposed, the receiving-side UCA of the OAM mode-multiplexing receiving apparatus includes a first receiving-side antenna pair including two receiving antenna elements corresponding to the first transmitting-side antenna pair and disposed on a third axis, and a second receiving-side antenna pair including two other receiving antenna elements corresponding to the second transmitting-side antenna pair and disposed on a fourth axis intersecting the third axis, and the information corresponding to the transmitting-side axis misalignment includes first polarity information indicating a polarity of a difference between two OAM reception weights corresponding to the second receiving-side antenna pair, and second polarity information indicating a polarity of a difference between two other OAM reception weights corresponding to the first receiving-side antenna pair.

14. The control apparatus according to claim 10, wherein the outputting the signal for controlling the phase adjustment unit includes calculating a direction adjustment reference plane used for beam adjustment based on the information corresponding to the transmitting-side axis misalignment, forming a phase adjustment signal for shifting a beam emitting direction of the transmitting-side UCA from a reference beam direction by an amount equivalent to an angle from an initial direction adjustment reference plane to the calculated direction adjustment reference plane, and outputting the formed phase adjustment signal to the phase adjustment unit.

15. The control apparatus according to claim 13, wherein the outputting the signal for controlling the phase adjustment unit includes:
  holding a first angle adjustment value around the first axis and a second angle adjustment value around the second axis;
  updating the first angle adjustment value based on the first polarity information and updating the second angle adjustment value based on the second polarity information; and
  forming a phase adjustment signal for shifting a beam emitting direction of the transmitting-side UCA from a reference beam direction based on the updated first and second angle adjustment values and initial values of the first and second angle adjustment values.

16. The control apparatus according to claim 10, wherein
  the OAM mode-multiplexing transmitting apparatus comprises a detection unit configured to detect a value of the transmitting-side axis misalignment, and
  the acquiring includes acquiring the value of the transmitting-side axis misalignment as the information corresponding to the transmitting-side axis misalignment.

* * * * *